United States Patent
Rasmussen

(10) Patent No.: US 7,114,737 B1
(45) Date of Patent: Oct. 3, 2006

(54) RECUMBENT VEHICLE

(75) Inventor: C. Martin Rasmussen, 374 S. Sterling Dr., Fruit Heights, UT (US) 84037

(73) Assignee: C. Martin Rasmussen, Kaysville, UT (US)

(*) Notice: Subject to any disclaimer, the term of this patent is extended or adjusted under 35 U.S.C. 154(b) by 0 days.

(21) Appl. No.: 11/097,813

(22) Filed: Apr. 1, 2005

Related U.S. Application Data

(60) Provisional application No. 60/559,180, filed on Apr. 2, 2004.

(51) Int. Cl.
*B62M 9/00* (2006.01)
*B62M 1/02* (2006.01)

(52) U.S. Cl. .................. 280/261; 280/282; 280/288.1

(58) Field of Classification Search ............. 280/259, 280/260, 261, 288.1, 282
See application file for complete search history.

(56) References Cited

U.S. PATENT DOCUMENTS

| | | | |
|---|---|---|---|
| 3,329,444 A * | 7/1967 | Lidov | 280/210 |
| 3,979,136 A * | 9/1976 | Lassiere | 280/278 |
| 4,070,032 A * | 1/1978 | Cunningham | 280/231 |
| 4,826,190 A * | 5/1989 | Hartmann | 280/236 |
| 5,069,469 A * | 12/1991 | Rosengrant et al. | 280/288.1 |
| 5,788,254 A * | 8/1998 | Davis | 280/282 |
| 5,873,590 A * | 2/1999 | Abe et al. | 280/259 |
| 6,000,707 A * | 12/1999 | Miller | 280/288.1 |
| 6,695,335 B1* | 2/2004 | Gaastra | 280/288.1 |
| 2005/0062254 A1* | 3/2005 | Nicolai | 280/260 |
| 2005/0217914 A1* | 10/2005 | Sugimoto | 180/205 |
| 2005/0253356 A1* | 11/2005 | Matsueda et al. | 280/260 |

* cited by examiner

*Primary Examiner*—Kevin Hurley
(74) *Attorney, Agent, or Firm*—Workman Nydegger

(57) ABSTRACT

Disclosed is a recumbent bicycle having a frame with at least one tubular member having a lumen. Mounted to the frame are a rear wheel assembly and a transmission assembly. The transmission assembly can include a first gear, a second gear, and a chain that extends from the first gear to the second gear and through the lumen of the at least one tubular member. Pedals and crank arms can mount to the second gear, which is slidable relative to the first gear to vary the position of the second gear relative to a seat mounted to the frame. A suspension assembly can mount a pair of front wheels to the frame at a location intermediate of the first portion and the second portion of the frame. The bicycle enables riders of different leg lengths to use the recumbent bicycle, while the suspension assembly cushions the rider during use.

23 Claims, 20 Drawing Sheets

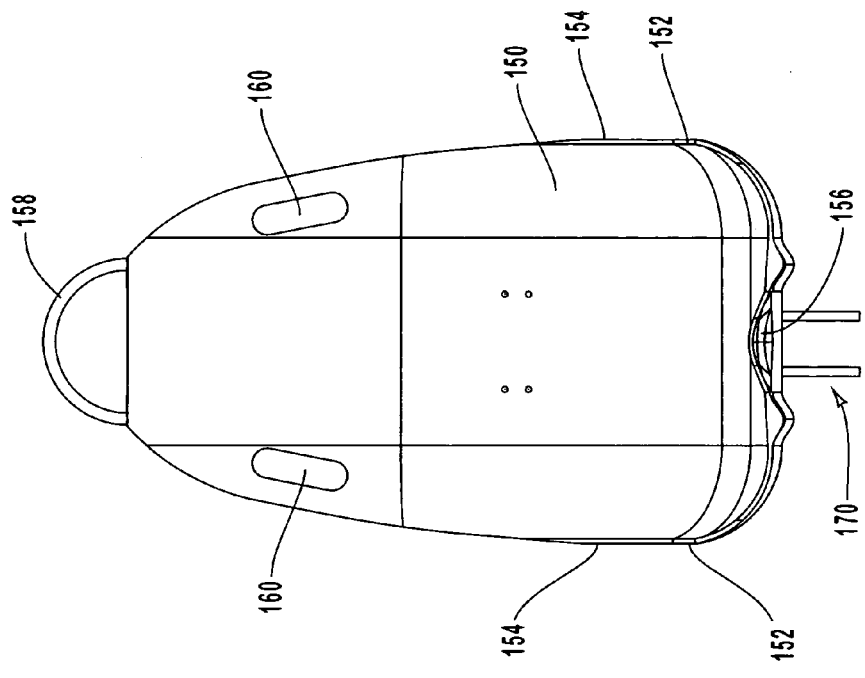
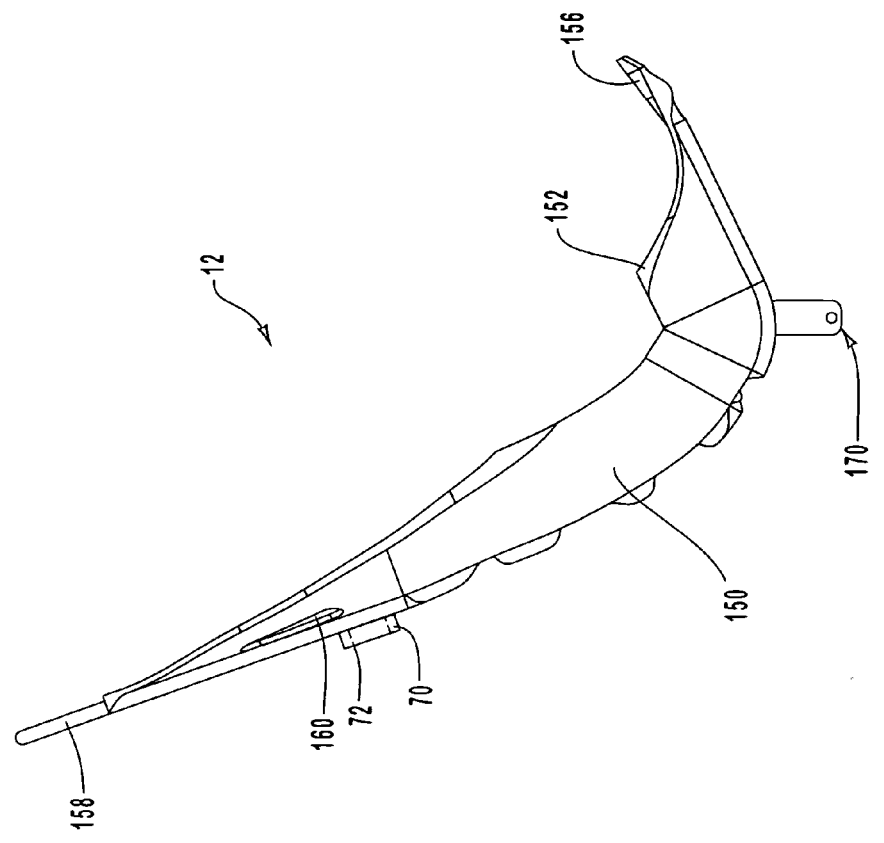

RECUMBENT VEHICLE

This application claims the benefit of United States Provisional Patent Application No. 60/559,180, filed Apr. 2, 2004 and entitled "Recumbent Bicycle", the disclosure of which is incorporated herein by this reference.

BACKGROUND OF THE INVENTION

1. The Field of the Invention

The present invention generally relates to human powered and powered vehicles. More specifically, the present invention relates to a recumbent bicycle that is simple to operate and maintain.

2. The Relevant Technology

There is a continued effort to introduce more and more individuals to the sport of bicycling. This sport provides many advantages to those that participate. In addition to obtaining exercise, which is an ongoing battle for numerous individuals, bicycling enables the riders to experience the outdoors and view beautiful scenery. Also, riders can experience the thrill of a competing in a race.

Depending upon the type of bicycling that a rider may wish to perform, the rider may have to sit in a particular orientation relative to the pedals, crank arms, seat, and handle bars. Varying the position of the rider can have dramatic affect upon the amount of power the rider translates to the crank arm and so gearing of the bicycle. More comfortable positions may not allow the rider to generate the amount of power possible from an uncomfortable sitting position. For instance, a touring bicyclist may be more comfortable than a racer that has an uncomfortable sitting position.

Although individuals of varying ages can enjoy the sport of bicycling, as riders become older it becomes more difficult to use existing bicycles due to the typical riding position where the rider has to lean forward onto the handle bars when extra power is required. To alleviate the problems with the difficult riding position, many bicycling enthusiast turn to recumbent bicycles that allow the rider to have a more comfortable sitting position.

One type of recumbent bicycle has two wheels with the seat mounted on a frame between the two inline wheels. The seat includes a back rest to provide support for the rider. The crank arm and pedals are typically mounted to the front of the frame forward of the front wheel so that the rider's legs are either generally horizontal or slightly upwardly inclined while riding. This orientation allows the rider to apply great amounts of force to the pedals and crank arm. Unfortunately, this type of recumbent bicycle still has a number of problems for older bicyclists. Due to the sitting position, i.e., the legs horizontal or slightly upwardly inclined while riding, balancing the recumbent bicycle can be somewhat difficult. Additionally, mounting the bicycle can be difficult due to the placement of the frame and seat. Furthermore, long lengths of exposed chain extend between the front and rear of the bicycle since the crank arm and pedals are at the front of the bicycle and the main gearing is located upon the rear wheel of the bicycle. This chain can contact the clothes of the rider and stain or damage the same.

Reducing some of the problems with the two-wheel recumbent bicycle can be achieved through use of a typical three wheeled recumbent bicycle. The three-wheeled recumbent bicycle provides greater stability than the two-wheel recumbent, however, much of the problems with the two-wheel recumbent bicycle remain. For instance, riders can still find it difficult to mount the three-wheel recumbent bicycle and may still receive stains or damage to clothing.

In addition to the above problems, many two-wheel and three-wheel recumbent bicycles are fabricated from manufacture specific components that are difficult for a typical bicycle repair facilities to repair. Parts may need to be specially ordered from the manufacturer, decreasing the usability of the recumbent bicycles. Additionally, existing bicycle racks used to repair other typical bicycles may not be capable of mounting to existing recumbent bicycles.

What is needed is a recumbent bicycle that overcomes these problems and provides the rider with a comfortable and stable ride.

BRIEF SUMMARY OF THE INVENTION

A need therefore exists for a recumbent bicycle that eliminates the above-mentioned disadvantages and problems. The present invention is generally directed towards a recumbent bicycle that provides a stable platform upon which a rider may sit during bicycling. Advantageously, the recumbent bicycle includes a suspension assembly that provides a rider with a more comfortable ride than existing recumbent bicycles. The suspension can also position a seat at a height above the surface upon which the bicycle rests that is about the same as the horizontal portion of a typical chair to aid the rider with mounting and dismounting the recumbent bicycle. In addition to positioning the seat at the desired height, the seat can optionally be inclined and moved relative to the position of the pedals and crank arm.

In addition to the above, the recumbent bicycle can include mechanisms to move the orientation of the seat and the position of pedals and crank arms relative to the seat. In addition to being movable, the seat can flex to provide additional comfort to the rider. The flexing of the seat also aids the rider during turns by allowing the rider to "lean-into" the turn to provide increased stability to the bicycle.

In one embodiment, the recumbent bicycle can include a rear wheel assembly that is pivotally mounted to a first portion of a frame assembly. A transmission assembly can drivingly engage with the rear wheel assembly. The transmission assembly can include a first gear that is slidably mounted to a second portion of the frame assembly. Slidable mounting of the first gear allows the first gear to be moved relative to the frame assembly to vary a distance of the first gear from the rear wheel assembly. The recumbent bicycle can also include a front wheel assembly that mounts to the frame assembly at a location intermediate of the first portion and the second portion of the frame assembly.

In another embodiment, a recumbent bicycle can include a frame having a first portion and a second portion, the frame comprising at least one tubular member, the at least one tubular member having a first end, a second end, and a lumen extending from the first end towards the second end. A rear wheel assembly can pivotally mount to the first portion of the frame. A transmission assembly can be supported by the frame. This transmission assembly can have a first gear and a second gear mounted to the frame. A chain can extend from the first gear to the second gear and through the lumen of the at least one tubular member. The recumbent bicycle can also include a pair of front wheels that mount to the frame at a location intermediate of the first portion and the second portion of the frame.

In still another configuration, a recumbent bicycle can include a frame having a first portion and a second portion. The frame can have at least one tubular member with a lumen extending from a first end to a second end thereof. A rear wheel assembly can pivotally mount to the first portion of the frame. The frame can support a transmission assembly having a first gear mounted to the first portion and a second gear mounted to the second portion. A chain can extend from the first gear to the second gear and through the lumen of the at least one tubular member. A suspension assembly mounts a pair of front wheels to the frame at a location intermediate of the first portion and the second portion of the frame. The suspension assembly can include a pair of leaf springs mountable to the frame.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 12 illustrates a side view of a seat assembly of the recumbent bicycle
FIG. 1;

FIG. 13 illustrates a front view of the seat assembly of FIG. 12;

Generally, the present invention relates to a recumbent bicycle that provides a stable platform upon which a rider may sit during bicycling. The recumbent bicycle includes two or three wheels and provides a more comfortable and easier to operate ride than existing recumbent bicycles. A comfortable ride is at least partially provided by one or more of a suspension assembly for the forward wheels and/or a rear suspension mechanism for the rear wheel. Also, the seat of the recumbent bicycle provides comfort to the rider as it at least partially conforms to portions of the rider and can flex as a rider turns or steers the bicycle. Mechanisms to move the orientation of the seat and the position of pedals and crank arms relative to the seat allow the recumbent bicycle to accommodate variously sized riders and also provide a comfortable ride.

In addition to the above, a rider can easily mount and dismount the recumbent bicycle due to the position of the seat relative to the surface upon which the recumbent bicycle may rest. Positioning the seat at a height above the surface that is about the same as the horizontal portion of a typical chair aids the rider to mount and dismount the recumbent bicycle. In addition to positioning the seat at the desired height, the seat can optionally be inclined and moved relative to the position of the pedals and crank arm.

For ease of repair, typically replaced components of a recumbent bicycle are "off-the-shelf" bicycle components. This allows typical bicycle repair facilities to repair the recumbent bicycle without the need to contact the manufacturer and obtain specialized parts for the most common repairs. Using "off-the-shelf" components also allows a rider to upgrade the components as needed, without having to purchase a completely new recumbent bicycle. In this manner, the recumbent bicycle is adaptable to the type of rider and the quantity of money the rider wishes to spend upon the bicycle.

Figure 1:
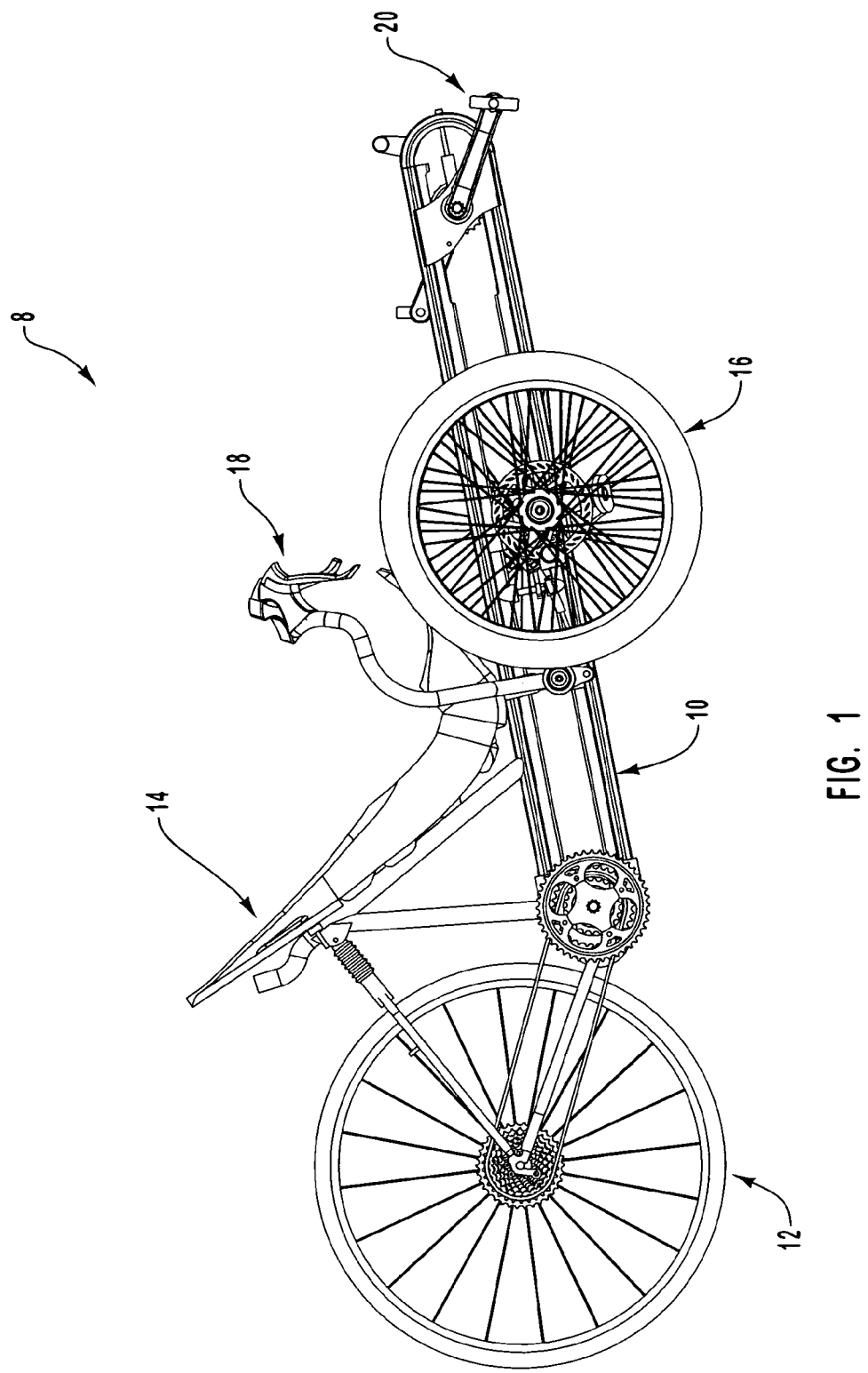
FIG. 1 illustrates a side view of one exemplary configuration of the recumbent bicycle of the present invention.

Generally, and with reference to FIG. 1, a recumbent bicycle 8 according to one exemplary configuration includes a frame assembly 10 upon which mount various assemblies and components. The frame assembly 10 provides structural support to recumbent bicycle 8 and can accommodate variously sized riders. Mounted to frame assembly 8 are a rear wheel assembly 12, a seat assembly 14, and a front wheel assembly 16. The rear wheel assembly 12, as the name suggests, includes the various components associated with the rear wheel of the recumbent bicycle, such as, but not limited to, a rear support structure, a rear shock assembly, a rear wheel, and a rear cassette with associated rear axle. As may be understood, a tire mounts to the rear wheel. One or more of these components may be off-the-shelf components to aid with easy repair of recumbent bicycle 8.

The seat assembly 14 generally provides the structures and components that enable a rider to sit upon recumbent bicycle 8, while front wheel assembly 16 provides the components associated with suspending the front wheels of front wheel assembly 16 from frame assembly 10 in a manner that dampens or absorbs the forces applied by bumps and other road hazards that a rider may encounter during a ride.

Also mounted to frame assembly 10 are a steering assembly 18 and a transmission assembly 20. The steering assembly 18 provides the components and structures that allow the rider to easily steer recumbent bicycle 8, while transmission assembly 20 provides the components and structures to enable a rider to "drive" or power recumbent bicycle 8 along a surface. For instance, transmission assembly 20 can include a rear gear ring that is linked to a pair of pedals and associated crank arms by a chain. To aid with mounting and dismounting of recumbent bicycle 8 or when the rider wishes to apply additional force to transmission assembly 20, such as when the rider is climbing a hill, the rider can lock the steering assembly 18 to aid in such endeavors.

Figure 2:
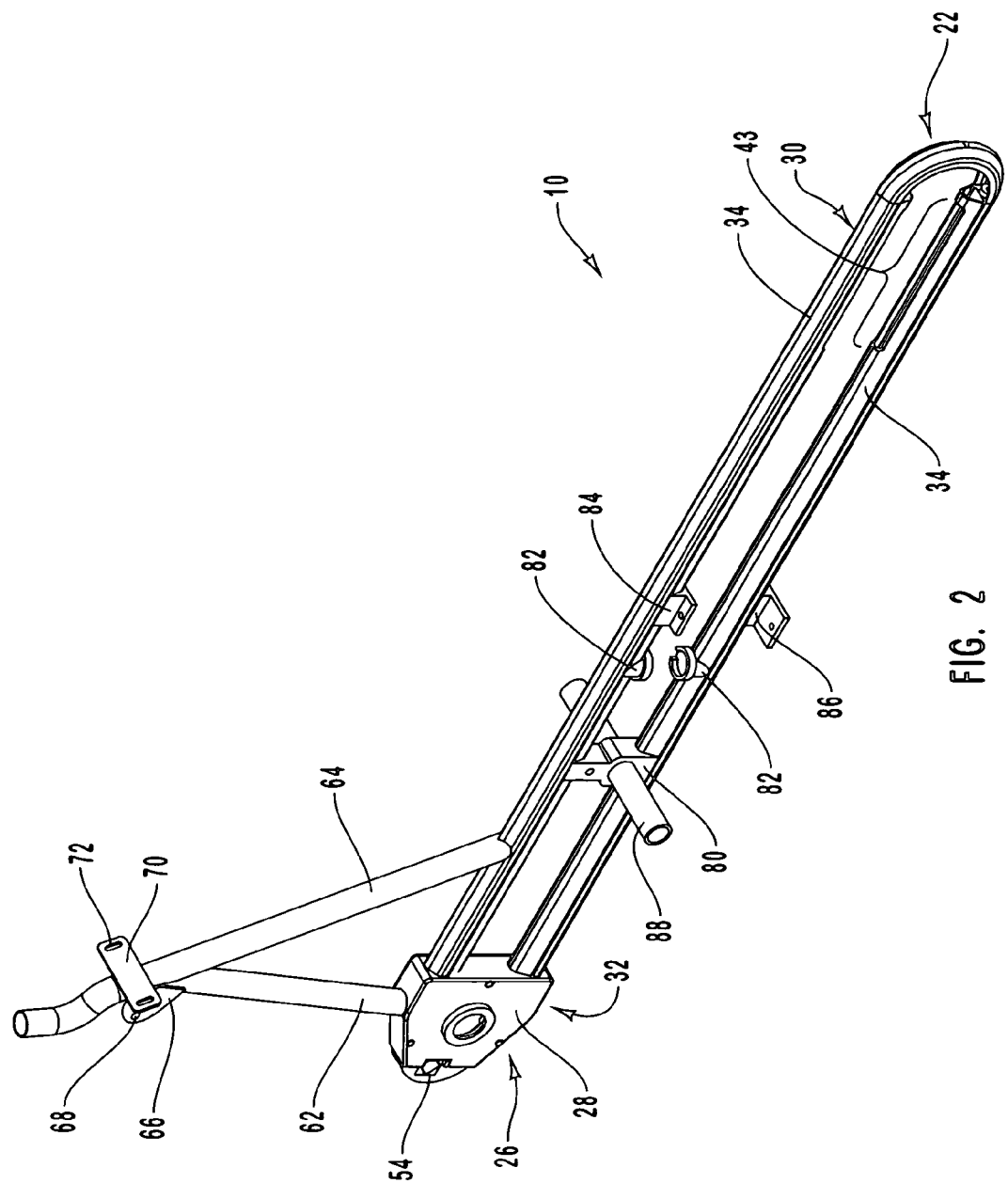
FIG. 2 illustrates a perspective view of one exemplary configuration of the frame assembly of the recumbent bicycle of FIG. 1.

With reference to FIG. 2, frame assembly 10 or more generally the frame can have a first end 30 and a second end 32. Two tubular members 34 extend from first end 30 toward second end 32, with a nose member 22 disposed at the first end 30 and a transmission assembly disposed at second end 32; the transmission assembly including a rear transmission case 26 and a rear transmission cover 28. Each tubular member 34 can have a generally polygonal cross-section, as can be better seen in FIG. 3, with a first channel 36 and a second channel 38. Disposed in second channel 38 can be threaded member 40 having a threaded hole 42. The threaded hole 42 can accommodate a fastener (not shown) that passes through a portion of nose member 22 and engages the threaded hole 42 to mount nose member 22 to tubular members 34.

As mentioned above, fasteners (not shown) can be used to mount nose member 22 to each tubular member 34 so that nose member 22 connects the two tubular members 34. In another configuration, nose member 22 can, slide within channel 38 of tubular members 34 to aid with varying a position of the crank arms and pedals to accommodate riders with varying leg lengths. In still another configuration, nose member 22 can both cooperate with threaded hole 42 and channel 38. Second channel 38 can have various cross-sectional configurations, including but not limited to, generally polygonal, round, oval, square, rectangular, triangular, or any other cross-sectional configurations.

Figure 3:
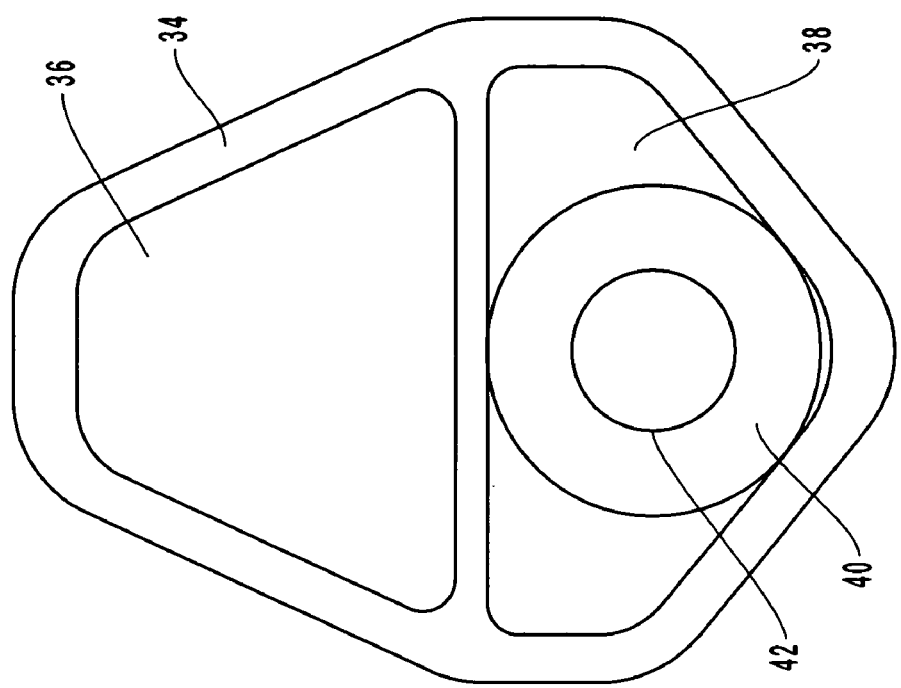
FIG. 3 illustrates an end view of one exemplary configuration of a tubular member of the frame assembly of FIG. 2.

The illustrated configuration of tubular member 34 depicted in FIG. 3 represents the lower of the two tubular members 34 of FIG. 2. It will be understood that the upper of the two tubular members 34 could have a similar configuration, but inverted to that illustrated in FIG. 3. The discussion provided herein applies to both such tubular members 34. Further, although reference is made to a generally polygonal cross-section, one skilled in the art will appreciate that each tubular member 34 can include a various other cross-sections, such as but not limited to, generally round, oval, square, rectangular, triangular, or any other cross-section.

Figure 4:
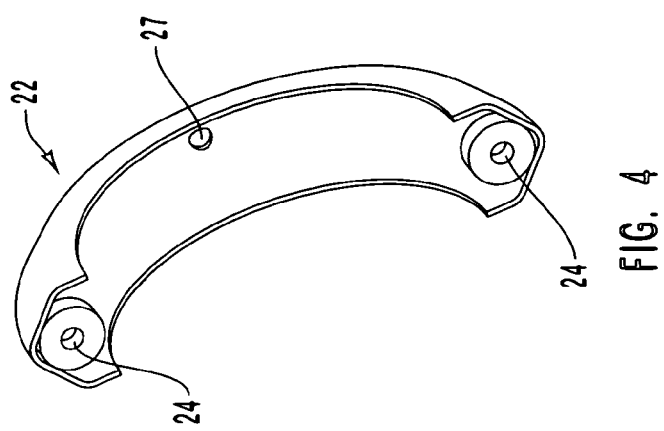
FIG. 4 illustrates a perspective views of an exemplary configuration of a nose member of the frame assembly of FIG. 2.

As shown in FIG. 4, the cross-section of nose member 22 can be such that it cooperates with second channel 38 (FIG. 3) and optionally prevents rotational motion of nose member 22 relative to tubular member 34. Although one cross-sectional configuration is illustrated in FIGS. 3 and 4, it will be understood that various other configurations are possible so long as they cooperate to prevent rotational motion of nose member 22 relative to tubular member 34.

The nose member 22 can include holes 24 that aid with mounting nose member 22 to tubular members 34 (FIG. 3). Each hole 24 can receive a fastener (not shown) that threadably engages with threaded hole 42 of threaded member 40. By so doing, nose member 22 mounts to tubular members 34 (FIG. 3). Additionally, nose member 22 can include a hole 27 that receives a portion of transmission assembly 20 (FIG. 1) to aid with positioning transmission assembly 20 (FIG. 1) to accommodate riders of various stride lengths. Although nose member 22 is illustrated as having a generally curved configuration, it will be understood by those skilled in the art that nose member 22 can have a polygonal, square, rectangular, triangular, oval, or other configuration.

Returning to FIG. 3, channel 36 can receive a chain that forms part of transmission assembly 20. Generally, the configuration of tubular members 34 enables the chain to be enclosed and prevents inadvertent contact to the rider or the rider's clothes. In this manner, the tubular members 34 aid to prevent staining or damage to the rider and/or rider's clothes. As with channel 38, channel 38 can various cross-sectional configurations, such as but not limited to, generally polygonal, round, oval, square, rectangular, triangular, or any other cross-sectional configurations that allow the chain to pass therethrough.

Returning to FIG. 2, each tubular member 34 can include a recessed portion 43. This recessed portion 43 cooperates with transmission assembly 20 (FIG. 1) and aids with movement of transmission assembly 20 (FIG. 1) to accommodate riders of differing stride lengths. The configuration of recessed portion 43 can vary based upon the configuration of transmission assembly 20 (FIG. 1). For instance, the shape, depth, and length of recessed portion 43 can vary so that transmission assembly 20 (FIG. 1) can be moved along the length of recessed portion 43.

Figure 5:
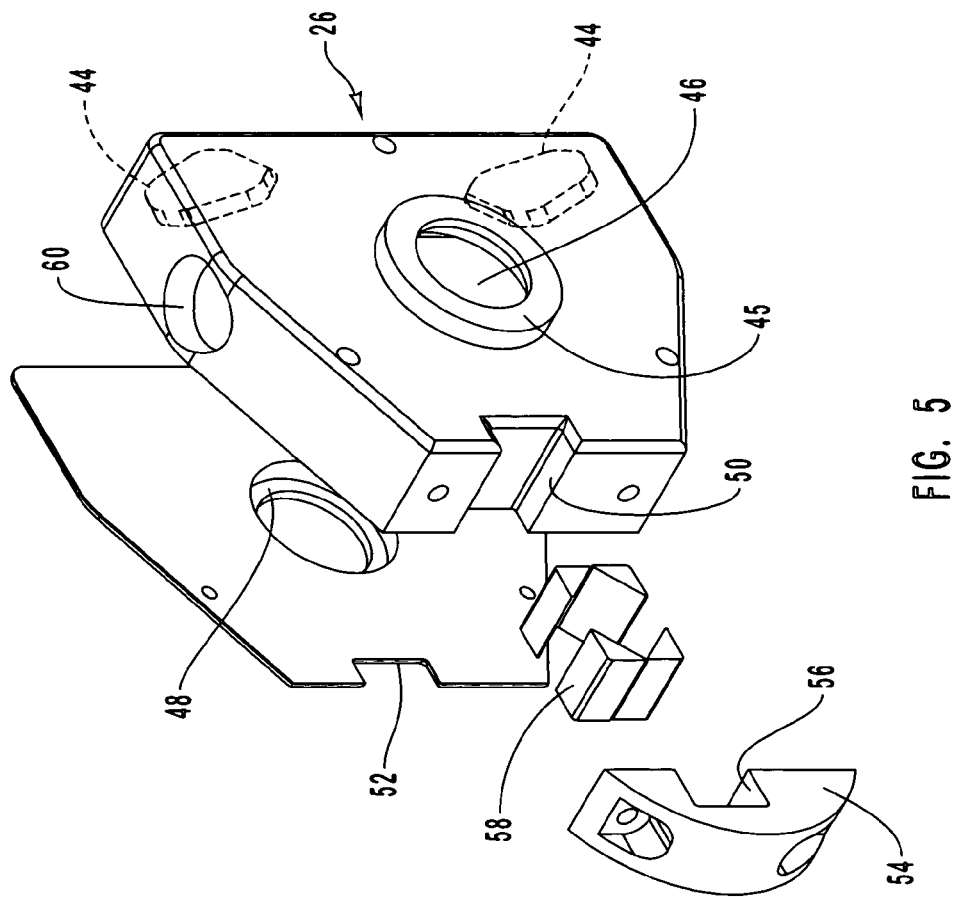
FIG. 5 illustrates an exploded perspective view of one exemplary transmission assembly of the frame assembly of FIG. 2.
Figure 6:
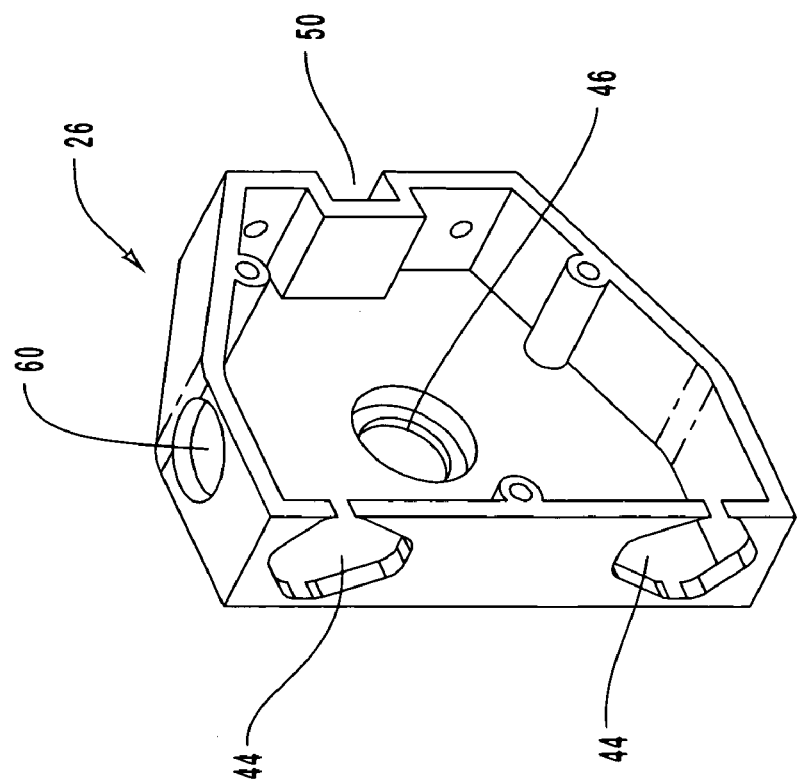
FIG. 6 illustrates a perspective view of an exemplary rear transmission case of the transmission assembly of FIG. 6.

Disposed at second end 32 of frame assembly 12 is rear transmission case 26 and rear transmission cover 28, collectively the rear transmission case assembly. As the names imply, rear transmission cover 28 is a cover to rear transmission case 26. The rear transmission case 26 can support the axle (not shown) and some of the other components of transmission assembly 20 (FIG. 1). The rear transmission case 26 can slidably receive tubular members 34 by way of holes 44, which are shown in FIGS. 5 and 6. As illustrated in FIG. 6, holes 44 have substantially the same configuration as the outer surface of tubular members 34 (FIG. 3) to enable secure mounting of tubular members 34 (FIG. 3) to rear transmission case 26. The engagement of tubular members 34 (FIG. 3) and holes 44 prevents rotational movement of tubular members 34 (FIG. 3) and so provides structural stability to frame assembly 10 (FIG. 2).

Figure 7:
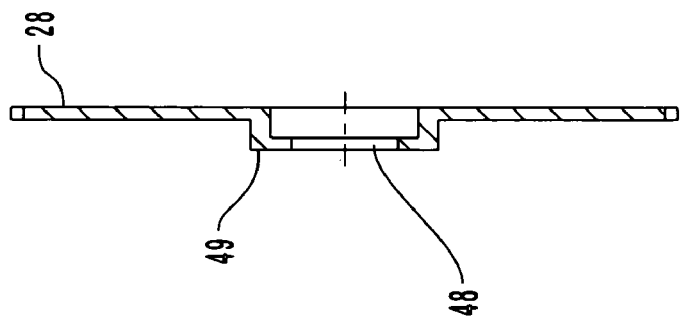
FIG. 7 illustrates a cross-sectional view of one exemplary rear transmission cover of the frame assembly of FIG. 2.

Returning to FIG. 5, passing through a portion of rear transmission case 26 is an axle hole 46 that receives a portion of the rear axle (not shown) to which mounts the rear gear ring of transmission assembly 20. This axle hole 46 can optionally include an internal thread to receive a cover or cap that prevents debris from entering into the interior of rear transmission case 26. Surrounding axle hole 46 is a flange 45 to provide additional structural support to the rear axle (not shown). To further prevent migration of debris, rear transmission cover 28 can mount to rear transmission case 26 by way of complementary fasteners, holes, and fastening structures. For instance, screws, bolts, or other mechanical fasteners may be used to releasably attach rear transmission cover 28 to rear transmission case 26. As with rear transmission case 26, an axle hole 48 complementary to axle hole 46 is also formed in rear transmission cover 28. As illustrated in FIG. 7, surrounding axle hole 48 is a flange 49 to provide additional structural support to the rear axle (not shown).

Returning to FIG. 5, rear transmission case 26 includes a notch 50 that can cooperate with a portion of rear wheel assembly 12 (FIG. 1). Similarly, rear transmission cover 28 can include a notch 52 that is complementary to notch 50. A rear wheel assembly clamp 54, optionally forming part of the transmission assembly, cooperates with rear transmission case 26 and rear transmission cover 28. This rear wheel assembly clamp 54 can include a notch 56 that is complementary to notches 50 and 52 of rear transmission case 26 and rear transmission cover 28 can aid with mounting rear wheel assembly 12 (FIG. 1) to frame assembly 10. Optionally disposed within notches 50, 52, and 54 are one or more bearings 58, such as torsion bearings, that maintain rear wheel assembly 12 (FIG. 1) within notches 50, 52, and 54. The bearings 58 also allow controlled rotational motion of rear wheel assembly 12 (FIG. 1) relative to frame assembly 10 (FIG. 1) to reduce the impact forces transferred to a rider during use of the bicycle 8 (FIG. 1). More specifically, a mount member or portion of rear wheel assembly 12 (FIG. 1) can locate within notches 50 and 52. When rear wheel assembly clamp 54 removably mounts to rear transmission case 26, complementary notch 56 engages with the mount member of rear wheel assembly 12 (FIG. 1) and bearings 58 to secure rear wheel assembly 12 (FIG. 1) to frame assembly 10 (FIG. 1). Notches 50, 52, and 54 can have various configurations so long as they can receive a portion of and prevent unwanted motion of rear wheel assembly 12 (FIG. 1).

Returning to FIG. 2, mounted to second end 32 of frame assembly 32 are an upper tube 62 and a seat tube 64. These tubes 62 and 64 can be connected by one or more support flanges 66 that extend between tubes 62 and 64. As shown, upper tube 62 mounts to rear transmission case 26, such as by way of a hole 60 (FIG. 5) and seat tube 64 mounts to one of tubular member 34. Attachment of upper tube 62 and seat tube 64 can be by way of welding, adhesives, mechanical fasteners or other manners of connecting or mounting two members together.

The configuration of upper tube 62, seat tube 64, and flanges 66 provide structural support to rear wheel assembly 12 (FIG. 1). The combination of upper tube 62, rear transmission case 26, and rear wheel assembly clamp 54 provide attachment points for rear wheel assembly 12 (FIG. 1). While upper tube 62 supports rear wheel assembly 12 (FIG. 1), it also supports seat tube 64 upon which mounts at least a portion of seat assembly 14 (FIG. 1) by way of an upper seat bracket 70. As shown in FIG. 1, the orientation of upper tube 62 and seat tube 64 relative to the remainder of frame assembly 10 creates a support triangle. Due to this configuration, structural support is provided to both seat assembly 14 and rear wheel assembly 12. Additionally, the triangular configuration of a portion of rear wheel assembly 12 further provides structural strength to recumbent bicycle 10. In this manner, the orientation and positioning of tubes 60, 64, and rear wheel assembly 12 provides structural support to one another.

A portion of rear wheel assembly 12 (FIG. 1) can locate between support flanges 66 and be secured in place by a mechanical fastener passing through a hole 68 in each flange 66 and the portion of rear wheel assembly 12 (FIG. 1) disposed therebetween. It will be understood that this structure is only one manner of attaching rear wheel assembly 12 (FIG. 1) to upper tube 62. In other configuration, a single flange 66 may be used to connect rear wheel assembly 12 (FIG. 1) to upper tube 62. In still another configuration, upper tube 62 can include recesses or other structures that cooperate with rear wheel assembly 12 (FIG. 1) without using flanges. One skilled in the art will understand that various other manners of attaching rear wheel assembly 12 (FIG. 1) to upper tube 62 are possible.

The seat tube 64 can also receive a seat bracket 70. The upper seat bracket 70, which is welded to, integrally formed with, or otherwise connected to seat tube 64 can be used to securely attach a seat 150 (FIG. 12) to seat tube 64. The seat bracket 70 can include holes 72 that can receive fasteners to mount seat 150 (FIG. 12) to seat tube 64. Various fasteners can be used to connect seat brackets to the seat and respective attachment members. For instance, nuts and bolts, screws, quick-release connectors, or other mechanical fasteners. Alternatively, thermal bonding, chemical bonding, or adhesives can be used to connect the respective brackets or members.

With continued reference to FIG. 2, frame assembly 10 can include various attachment members 80, 82, 84, and 86, and attachment tube 88 that facilitate attaching of front wheel assembly 16 and steering assembly 18. These components generally having configurations that enable attachment directly to one or both tubular members 34.

Figure 8:
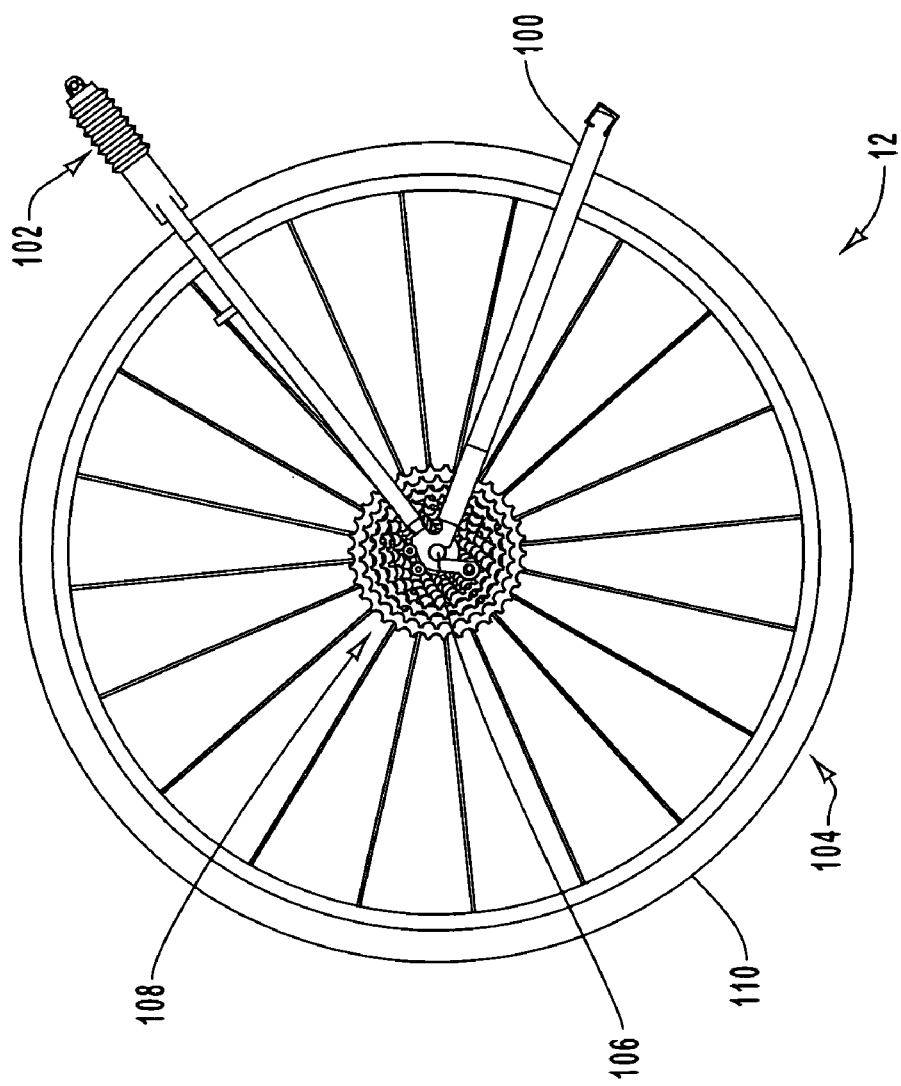
FIG. 8 illustrates a side view of a rear wheel assembly of the recumbent bicycle of FIG. 1.

As mentioned above, mounted to frame assembly 10 is rear wheel assembly 12, one configuration of which is illustrated in FIG. 8. As shown, rear wheel assembly 12 can include a rear support structure 100 to which mounts a rear shock assembly 102 and a rear wheel 104. The rear wheel 104 can include a rear cassette 108 and mount to rear support structure 100 by way of a rear axle 106. The rear wheel assembly 12 can have a similar configuration to a typical bicycle so that the components are simple to repair by typical bicycle repair facilities. Consequently, rear shock assembly 102, rear wheel 104 and associated tire 110, rear cassette 108, and rear axle 106 can be standard bicycle components known to those skilled in the art. For instance, rear axle 106 can be at least partially threaded to cooperate with one or more fasteners. Further, rear shock assembly 102, such as a spring, pneumatic, hydraulic, or other shock, can extend between upper tube 62 (FIG. 2) and rear support structure 100 using typical fasteners or techniques.

Figure 10:
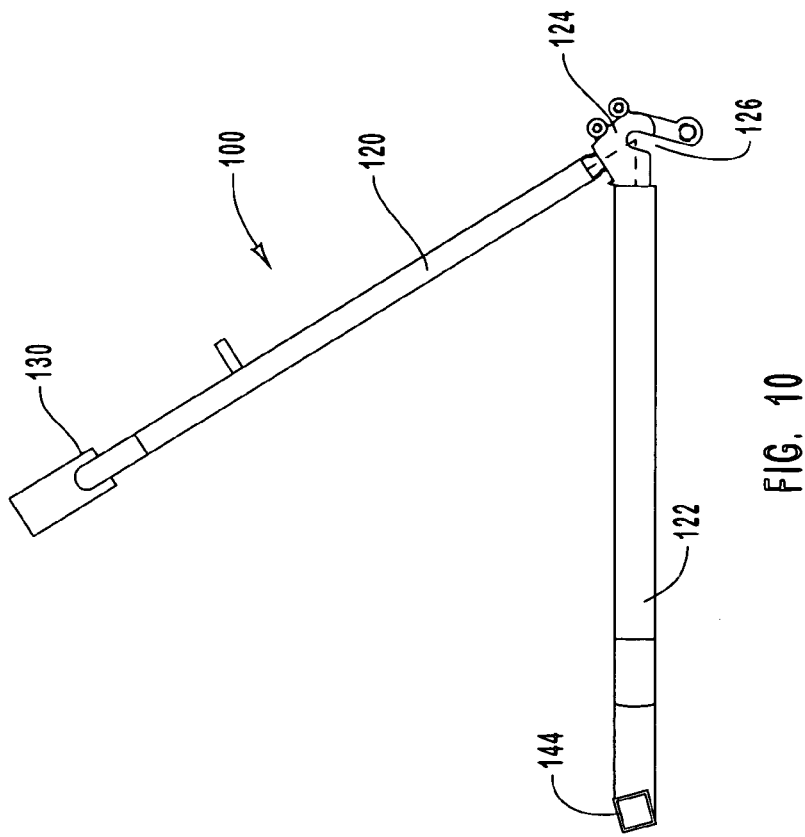
FIG. 10 illustrates a side view of the exemplary embodiment of the rear support structure of the recumbent bicycle of FIG. 1.
Figure 9:
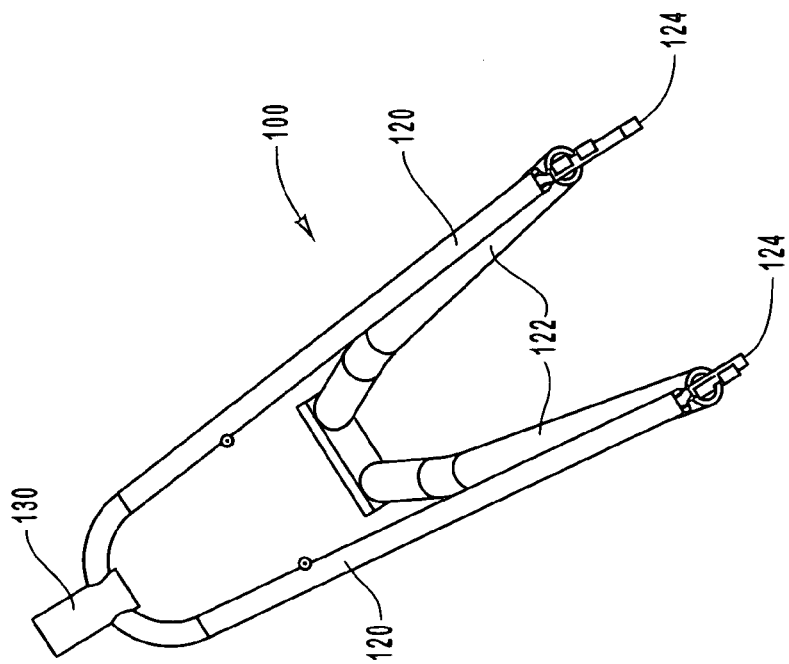
FIG. 9 illustrates a perspective view of a rear support structure of the rear wheel assembly of FIG. 8.

With reference to FIGS. 9 and 10, rear support structure 100 can have a pair of upper support members 120 and a pair of lower support members 122. Both support members 120 and 122 mount to an axle mount 124 having a channel 126. Although reference is made to support members 120 and 122 mounting to axle mount 124, one skilled in the art will understand that axle mount 124 can be integrally formed with support members 120 and 122. The rear wheel 104 (FIG. 8) couples to axle mount 124 by way of rear axle 106 (FIG. 8) cooperating with channel 126 as one or more fasteners releasably couple rear axle 106 (FIG. 8) to axle mount 124. The fasteners can include nuts or bolts, quick-release bicycle axles, or other bicycle related fasteners.

With reference to FIG. 9, upper support members 120 can cooperate with a rear shock mount 130 that receives and optionally forms a part of rear shock assembly 102 (FIG. 8). The configuration of rear shock mount 130 enables rear shock assembly 102 (FIG. 8) to cooperate with rear support structure 100 (FIG. 8) and mount to support flanges 64 (FIG. 2), such as by way of mechanical fasteners, threaded complementary structures, or other attachment techniques.

Although reference is made to upper support members 120 cooperating with rear shock mount 130, one skilled in the art will understand that rear shock mount 130 can be integrally formed with upper support member 120. Additionally, rear shock mount 130 can optionally directly connect with frame assembly 10, such as when rear wheel assembly 12 (FIG. 1) does not include rear shock member 102 (FIG. 1).

Figure 11:
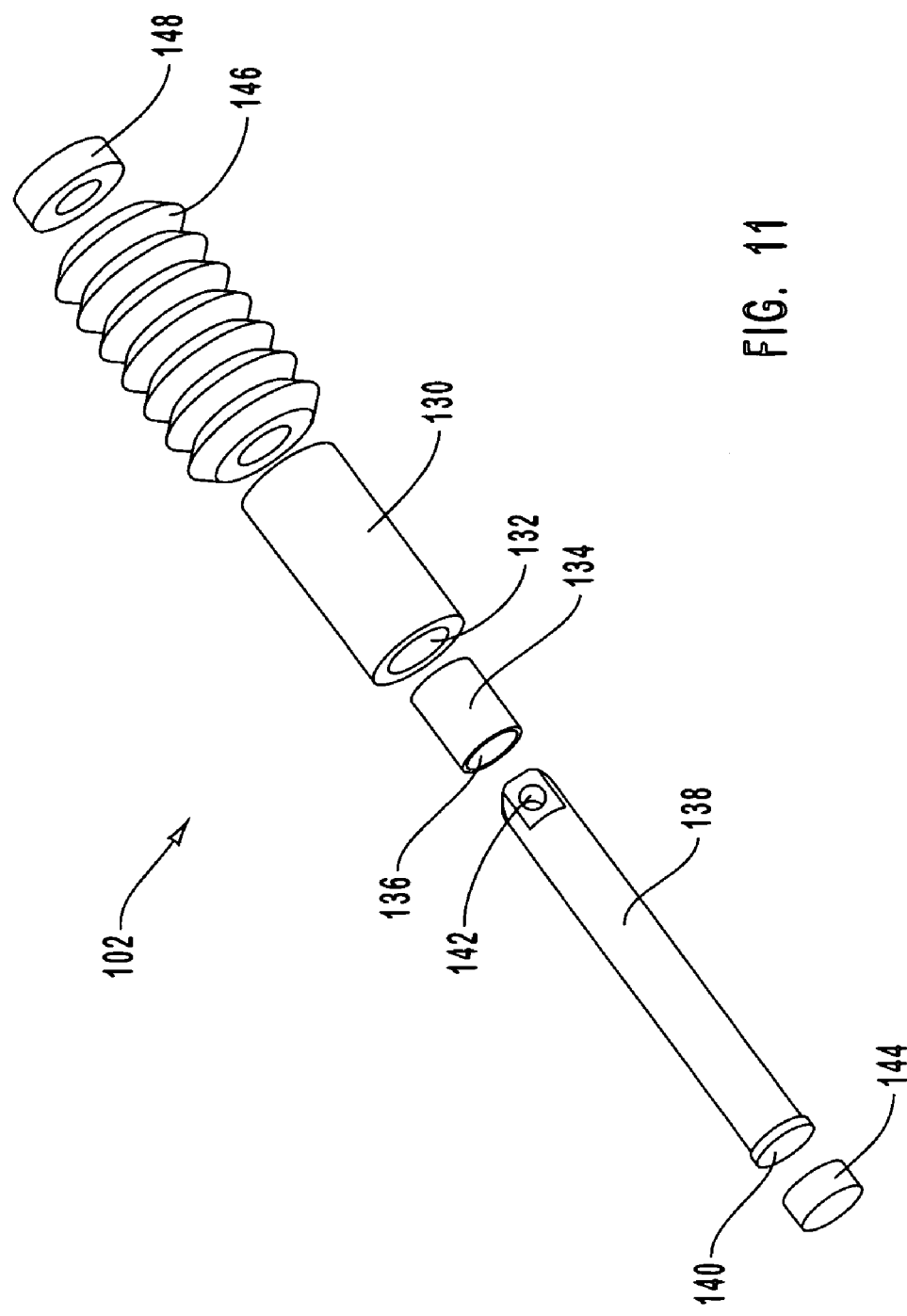
FIG. 11 illustrates an exploded perspective view of a rear shock assembly of the rear wheel assembly of FIG. 8.

Turning to FIG. 11, illustrated is one exemplary rear shock assembly 102 that can absorb some or all of the forces applied to rear wheel assembly 12 (FIG. 1) by the terrain traversed by bicycle 8 (FIG. 1) and so limit the forces applied to the rider seated thereupon. As illustrated, rear shock assembly 102 can include rear shock mount 130 having a lumen 132. Disposable within lumen 132 is a bushing 134, with a hole 136, which receives a shock shaft 138. Shock shaft 138 can be partially threaded and have one end with a stop 140 that prevents passage of shock shaft 138 completely through hole 136 of bushing 134 during use of shock shaft 138. The other end of shock shaft 138 can include a hole 142 to enable shock shaft 138, and so rear shock assembly 102, to attach to support flanges 64 (FIG. 2), by way of mechanical fasteners, threaded complementary structures, or other attachment techniques.

To provide a biasing force to rear shock assembly 102, a resistance or member 146 can mount to and at least partially surrounds shock shaft 138 when it is disposed into lumen 132 of rear shock mount 130. The resistance member 146 can be fabricated from a polymer, metal, or composite material based upon the degree of biasing force or resistance to movement of rear wheel assembly 12 (FIG. 8) relative to frame assembly 10 (FIG. 2) and/or the terrain traversed using recumbent bicycle 8 (FIG. 1). Different resistance members can be mounted to shock shaft 138 based upon the particular weight of the rider and/or the roughness of the terrain to be traversed using bicycle 8 (FIG. 1). As such, the resistance members can have different resiliencies and flexibilities.

A lock nut 148 can be received by shock shaft 138 to maintain resistance member 146 thereupon and also to vary the biasing force applied by resistance member 146. By moving lock nut 148 toward stop 140, the available stroke of resistance member 146 is decreased as resistance member 146 is partially compressed. Decreasing the stroke of rear shock assembly 102 reduces the amount of force that can be absorbed by rear shock assembly 102 and so makes the ride harder for the rider. Similarly, increasing the stroke of rear shock assembly 102 increases the amount of force that can be absorbed by rear shock assembly 102 and so makes the ride softer for the rider.

Although changing the position of lock nut 148 relative to shock shaft 138 is one way to change to length of travel of shock shaft 138 and/or resistance member 146, other ways are also possible. For instance, an extension member can be connected to rear shock mount 130 to increase its length. By so doing, the possible stroke length of shock shaft 138 within rear shock mount 130 can be increased to vary the amount of force absorption possible by resistance member 146. The extension member can be either releasably or fixably mounted to rear shock mount 130, such as by way of, but not limited to, complementary engageable portions on the extension member and rear shock mount 130, such as threads, keys and key way, etc, by adhesives, welds, etc, or other techniques known to those skilled in the art.

To prevent debris for entering into lumen 132, an end cap 144 can mount to an interior surface of lumen 132. End cap 144 can mount to lumen 132 such as by friction fit, threaded connection, mechanical fasteners, adhesives, or other manners of selectively mounting the end cap to the lumen of rear shock mount 130.

Returning to FIG. 9, to aid with attaching rear support structure 100 to frame assembly 10 (FIG. 2), a mount member 144 extends between lower support members 122. The mount member 144 can have a complementary configuration to notch 50 (FIG. 5) of rear transmission case 26 and complementary notch 56 (FIG. 5) of rear wheel assembly clamp 54 when rear wheel assembly clamp 54 mounts to rear transmission case 26. In this manner, rear wheel assembly 12 (FIG. 8) securely attaches to frame assembly 10, as illustrated in FIG. 1.

In addition to the above, it will be understood that recumbent bicycle 8 can include a derailleur (not shown) and a rear brake (not shown) that may be mounted to rear support structure 100. These components can be standard bicycle components known to those skilled in the art and can include the appropriated controls operable by the rider. For instance, the rider can control the derailleur using grip shifts, thumb shifters, road-bicycle type controllers or the like. Similarly, various types of brake levers and brakes can be used with recumbent bicycle.

As shown in FIG. 1, recumbent bicycle 8 includes a seat assembly 14. This seat assembly 14 provides a stable seat for the rider and supports the torso, buttocks, legs, and optionally head and neck of the rider. The seat of the seat assembly 14 is so positioned upon frame assembly 10 that a rider can easily sit and rise from the seat. In one configuration, the lower seating portion of the seat is positioned at a height above the surface that is about the same as the horizontal portion of a typical chair to aid the rider to mount and dismount the recumbent bicycle.

As shown in FIG. 12, seat assembly 14 can include a seat 150 having lower sides 152 and upper sides 154. Seat 150 and/or sides 152 and 154 can be contoured to hold the sides of the rider's torso, buttocks, and a portion of their legs. Although contoured to hold the rider, it will be understood that as the rider turns recumbent bicycle 8, seat 150, and sides 152 and 154 can flex to enable the rider to "lean-into" the turn and so provide the rider with greater control of recumbent bicycle 8. Furthermore, when riders having a larger frame sit in seat 150, it can flex to accommodate the rider and provide the desired support.

Generally, seat 150 securely holds the rider as they move recumbent bicycle 8 (FIG. 1). This seat 150 can be fabricated from a variety of materials, such as, but not limited to, carbon fiber, KEVLAR, composite materials, synthetic materials, polymers, plastics, or other materials having the desired strength and flexibility characteristics.

In addition to the above, a lower portion of seat 150 can include a lip 156, more clearly seen in FIG. 13, which prevents the rider sliding out of seat 150, while an upper portion of seat 150 can include a headrest 158 and holes 160. The headrest 158 provides support to the rider's head during use of seat 150 and can be optionally covered with a flexible material or some other material that can cushion the rider. More generally, any portion of seat 150 can include flexible material or some other material that can cushion the rider.

Holes 160 allow for air to pass through seat 150 to cool the rider as they pedal recumbent bicycle 8 (FIG. 1). Although two holes 160 are shown, it will be understood that a plurality of holes 160 can be placed over all, substantially all, or any selected portion of seat 150.

With continued reference to FIG. 13, seat assembly 12 can include a lower seat bracket 170 and upper seat bracket 70. The lower seat bracket 170 aids seat 150 to frame assembly 10 (FIG. 2). More specifically, lower seat bracket 170 can mount either directly or via an intermediate bracket to frame assembly 10. In other configurations, a bracket that allows the angular orientation of the seat to be varied can be used either instead of or in cooperation with lower seat bracket 170. For instance, an intermediate bracket with holes can extend from the seat to a modified seat bracket. The intermediate bracket can include holes that can align with complementary holes in the seat bracket. Once the holes are aligned, a fastener can fix the relative position of the brackets. In this manner, the seat can be reclined between about twenty-seven degrees and about thirty-five degrees depending upon the number of holes in the bracket. It will be understood that seat can incline a greater or lesser number of degrees than those indicated herein.

Returning to FIG. 1, recumbent bicycle 8 includes front wheel assembly 16. Generally, front wheel assembly 16 provides front suspension for recumbent bicycle 8. This front suspension can aid with providing a comfortable ride and also aid with steering control. The front suspension or the suspension assembly can include two-leaf springs, with the leaves being made of carbon fiber, a metal, an alloy, a polymer, a synthetic material, a composite material, combinations thereof, or other materials that can function as described herein. The leaf springs provide a certain level of dampening based upon the weight of the rider. The present invention contemplates that a number of different leaf springs can be used with recumbent bicycle 8 (FIG. 1), with the leaf springs being varied based upon the weight of the rider and the degree of dampening desired.

Figure 15:
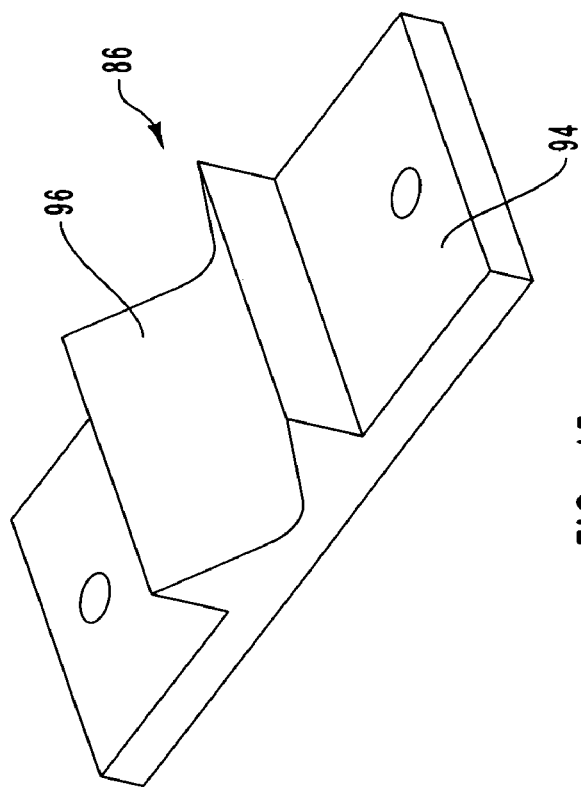
FIG. 15 illustrates a perspective view of a bottom attachment member of the frame assembly of FIG. 2.
Figure 14:
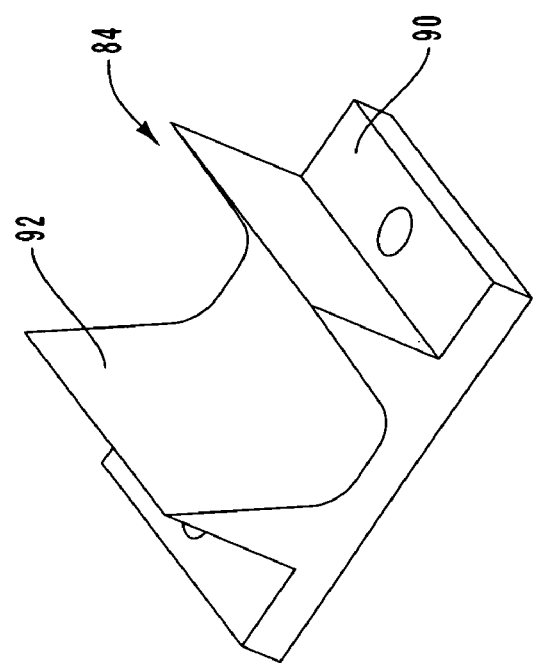
FIG. 14 illustrates a perspective view of top attachment member of the
FIG. 2.

The leaf springs mount to frame assembly 10 of the recumbent bicycle at their centers by attachment members 84 and 86, as illustrated in FIG. 2. The top attachment member 84, as illustrated in FIG. 14, can include a base 90 and a connecting portion 92 extending from base 90. The base 90 mounts to one of the leaf springs, while connecting portion 92 can engage with one of tubular members 34 (FIG. 2). Similarly, bottom attachment member 76, as shown in FIG. 15, can include a base 94 and a connecting portion 96 extending from base 94. As with base 90, base 94 can mount to one of the leaf springs, while connecting portion 96 can engage with one of tubular members 34 (FIG. 2). So long as connecting portions 92 and 96 are complementary to tubular members 34 (FIG. 2), connecting portions 96 and 96 can have various configurations.

Figure 16:
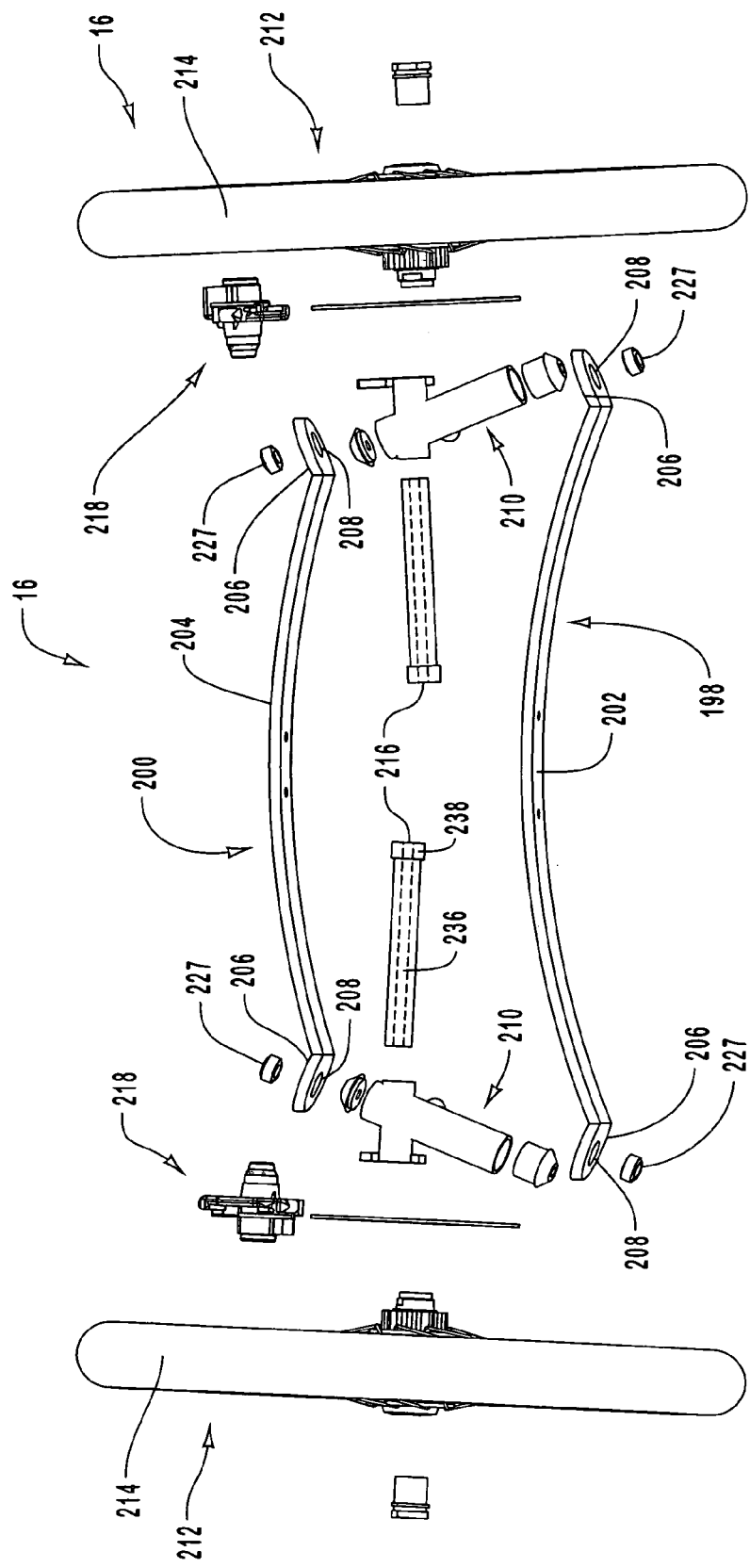
FIG. 16 illustrates an exploded front view of a front wheel assembly of the recumbent bicycle of FIG. 1.
Figure 17:
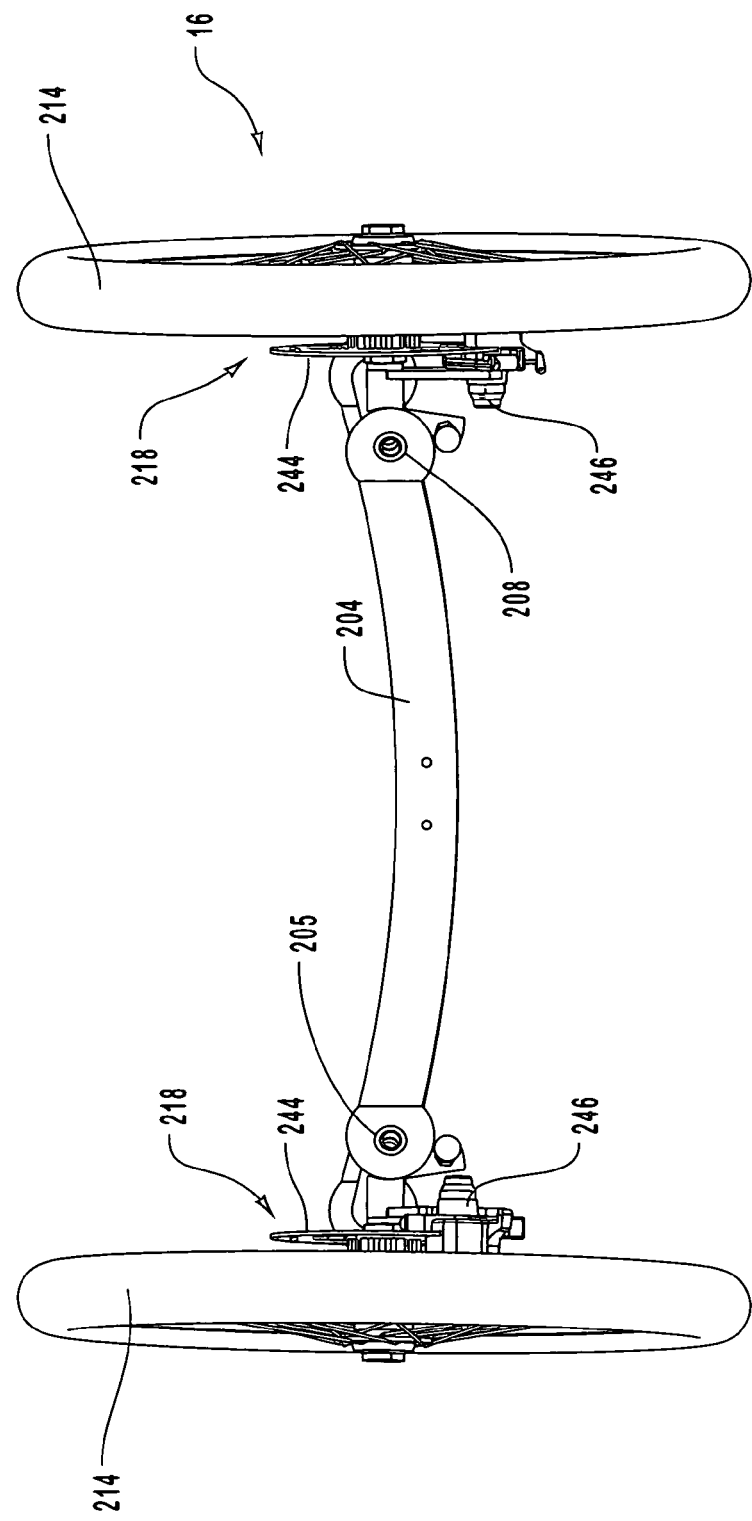
FIG. 17 illustrates a top view of the front wheel assembly of FIG. 16.

Turning now to FIGS. 16 and 17, illustrated is one exemplary configuration of front wheel assembly 16 that can be mounted to frame assembly 10 (FIG. 2) using the attachment members 84 and 86 described with respect to FIGS. 14 and 15. As shown in FIG. 16, front wheel assembly 16 can include a suspension assembly 198 that supports wheels 212 and connects front wheel assembly 16 to frame assembly 10 (FIG. 2). As illustrated, suspension assembly 198 can include a first leaf spring 200 and a second leaf spring 202. These leaf springs 200 and 202 have generally similar configuration, however, leaf spring 202 can be generally longer in length than leaf spring 200. Each leaf spring 200 and 202 can have a curved portion 204 and two generally planar portions 206 extending from curved portions 204. Each curved portion 204 can curve in one or more directions, such as curving toward planar portions 206 and curving relative to the longitudinal axis of recumbent bicycle 8 (FIG. 1).

The curved shape of springs 200 and 202 raise the position of crank arms and pedals of transmission assembly 20 (FIG. 1) to a higher, more comfortable height for the rider. The two-leaf springs 200 and 202 can be narrow and so enable the rider to easily mount and dismount the recumbent bicycle, while providing more leg space for turning the crank arms and pedals associated with transmission assembly 20 (FIG. 1). The leaf springs 200 and 202 also can weigh less than other types of suspension mechanism and so aid with reducing the overall weight of recumbent bicycle 8 (FIG. 1). It will be understood that the leaf springs form part of suspension assembly or a system that supports the frame assembly on the axles of wheels 212.

With continued reference to FIG. 16, mounted to planar portions 206 by way of holes 208 is a pair of kingpin assemblies 210. These kingpin assemblies 210 facilitate mounting of front wheels 212 to leaf springs 200 and 202 by accommodating a wheel shaft 216. Additionally, each kingpin assembly 210 provide a structure for supporting or to which can be mounted a disk brake assembly 218. The kingpin assembly 210 can be positioned on planar portions 206 of leaf springs 200 and 202 with a specific angular orientation relative to the center of each tire 214 of each wheel 212. By so doing, recumbent bicycle 8 (FIG. 1) is easy to steer. With the longitudinal axis of each kingpin assembly 210 pointing downward to where a center of tire 214 contacts the ground, it causes tires 214 to turn on a small contact point and thereby decreases the steering system's sensitivity to bumps in the road. Bump sensitivity can also be changed, by optionally inclining each kingpin assembly 210 relative to the recumbent bicycle's forward direction of travel, i.e., each kingpin assembly 210 incline away from the recumbent bicycle's forward direction of travel. With the angular inclination being about twelve degrees, it being understood that inclination angles greater or lesser than twelve degrees being possible, wheels 212 will return to the straight-ahead position in the absence of a steering input and can lean into a corner during a turn. Additionally, such inclination also dampens the forward and backward rocking motion of recumbent bicycle 8 (FIG. 1) that may occur after the rider engages the brakes (not shown).

In addition to varying the angular orientation of each kingpin assembly 210 to which wheels 212 mount, it is possible to incline wheels 212 relative to each kingpin assembly 210. Stated another way, wheels 212 can mount to each kingpin assembly 210 to have a neutral, positive, or negative camber depending upon the amount of slippage prevention required and the steering desired. Optionally, front wheels 212 can point slightly inward to aid with lateral stability.

Figure 18:
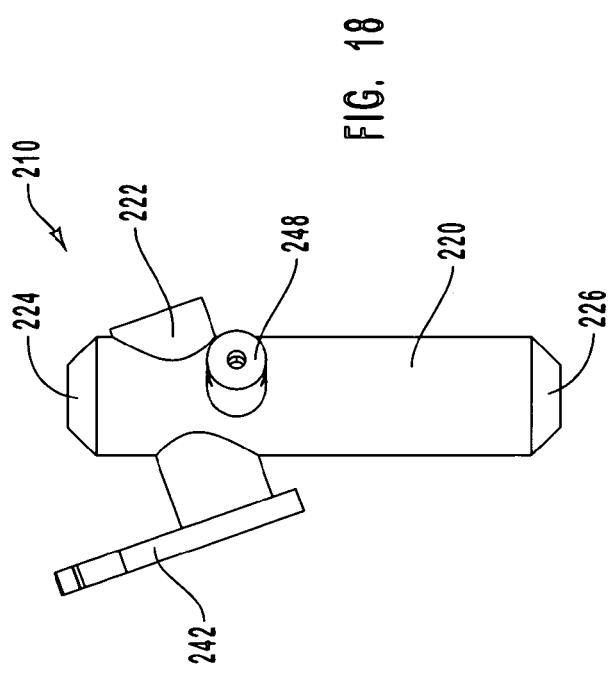
FIGS. 18–20 illustrate various views of one kingpin of the front wheel
FIG. 16.

Turning to FIGS. 18–21 illustrated are various views of a left kingpin a assembly 210. The following discussion is directed towards the left kingpin assembly 210; however, a similar discussion can also apply to the right kingpin assembly. With reference to FIG. 18, kingpin assembly 210 includes a body 220 and a member 222 angularly disposed through first member 220. The angular orientation of body 220 and member 222 arises due to the angular orientation of planar portions 206 (FIG. 16) of leaf springs 200 and 202 and the mounting of kingpin assembly 210 thereto. With the orientation of body 220 and member 222 generally match the angular orientation of planar portions 206 (FIGS. 16), wheel shaft 216 (FIG. 16) is generally horizontal. Varying the angular orientations of planar portions 206 (FIG. 16) and/or body 220 and member 222, changes the camber of wheels 212, i.e., neutral, positive, or negative camber, and so changes the riding and handling characteristics of recumbent bicycle 8 (FIG. 1).

The body 220 can be disposed between and maintain a desired separation of two leaf springs 200 and 202. To aid with providing the desired separation, a first cap 224 and a second cap 226 can mount to body 220. Each cap 224 and 226 can have a tapered configuration. This tapered configuration enables cap 224 and cap 226 to cooperate with hole 208 (FIG. 16) in leaf springs 200 and 202.

Each cap 224 and 226 can include a hole 228 (FIG. 19), optionally threaded, which receives a mechanical fastener to attach each kingpin assembly 210 to leaf springs 200 and 202. Various configurations of hole 228 and fastener are possible. As mentioned, first cap 224 and second cap 226 can cooperate with hole 208 (FIG. 16). In one configuration, hole 208 (FIG. 16) receives a bearing 227 (FIG. 16) that cooperates with first cap 224 and second cap 226. Since kingpin assembly 210 rotates relative to leaf springs 200 and 202 under the influence of steering assembly 18 (FIG. 1), inclusion of bearings 227 reduces the frictional contact therebetween. Various types of bearings may be used, such as but not limited to, ball bearings, roller bearings, spherical bearings, or other bearings known to those skilled in the art.

Extending from body 220 is a threaded protrusion 248. This protrusion 248 cooperates with steering assembly 18 (FIG. 1) so that movement of steering assembly 18 (FIG. 1) translates to movement of kingpin assembly 210 and so wheel 212 (FIG. 16). Although reference is made to protrusion 248 being threaded, i.e., including one or more threaded holes, one skilled in the art will understand that protrusion 248 can interference fit, friction fit, or slip fit with steering assembly 18 (FIG. 1). Additionally, mechanical fasteners can also be used to connect kingpin assembly 210 to steering assembly 18 (FIG. 1).

Figure 19:
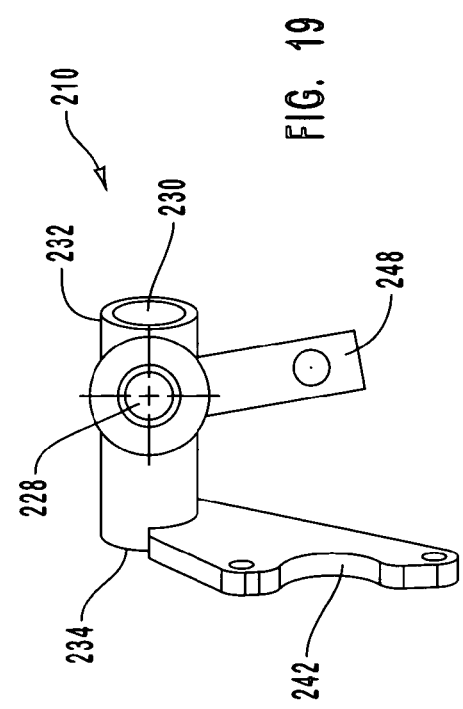
Figure 20:
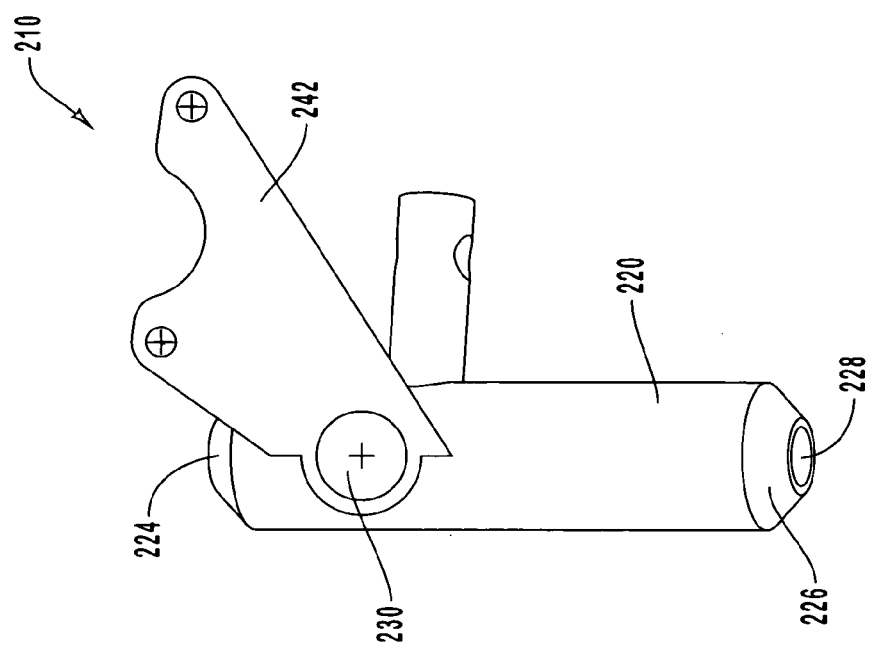

The member 222 of kingpin assembly 210 includes a hole 230, as shown in FIG. 19, that extends from second member's first end 232 to its second end 234. This hole 230 can have various configurations so long as it can receive wheel shaft 216, which is illustrated in FIG. 16. Since wheel shaft 216 can have a first portion 236 and a second portion 238 having an outside diameter larger than that of first portion 236, hole 230 receives first portion 236 and second portion 238 stops removal of wheel shaft 216 from hole 230. By including hole 240, illustrated by dotted lines in FIG. 16, which can receive a mechanical fastener (not shown), wheel 212 can mount to wheel shaft 216 and be secured in place by the mechanical fastener. The hole 240 is complementary to wheel shaft 216 and so can have various configurations.

Returning to FIGS. 18–21, mounted to second end 234 of member 222 is a mounting flange 242. Mounting flange 242 can have various configurations so long as it supports and receives disk brake assembly 218, which is illustrated in FIG. 17. This disk brake assembly 218 can include a disk 244 and a caliper 246. The caliper 246 may be operated by wire controls typically used with bicycles and which are mounted to a portion of steering assembly 18 (FIG. 1). Various types of disk 244 and caliper 246 are known to those skilled in the art. Further, various types of bicycle levers, shifters, and controller can be used to operate disk brake assembly 218.

Figure 22:
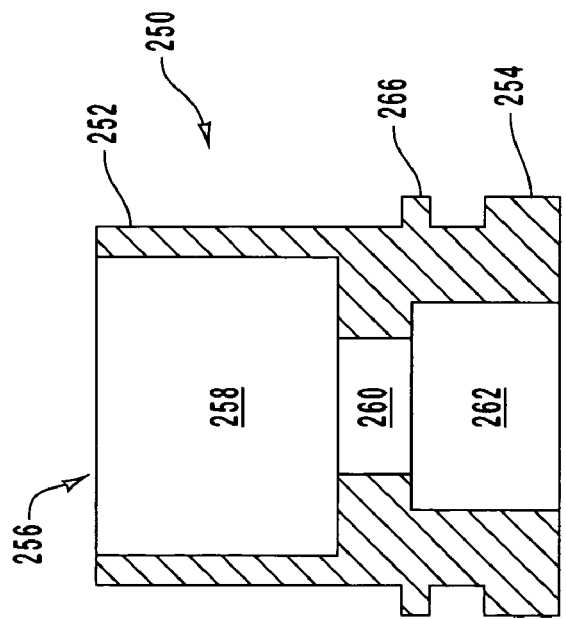
FIG. 22 illustrates a cross-sectional view of the wheel nut of FIG. 21.
Figure 21:
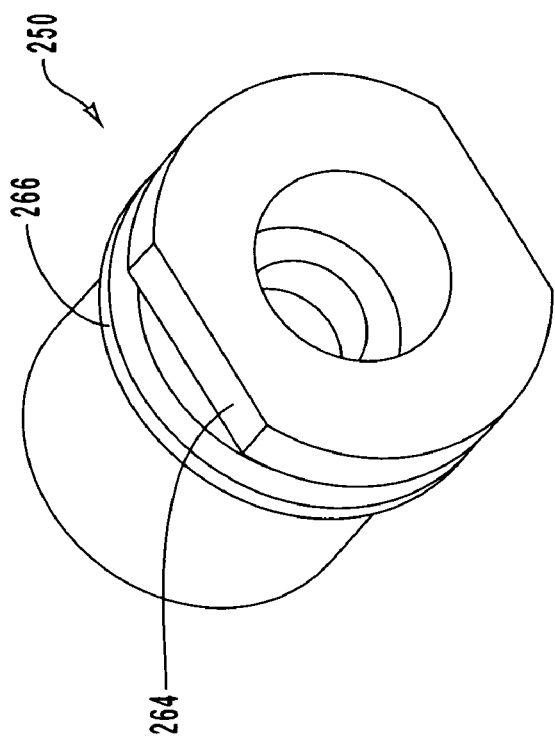
FIG. 21 illustrates a perspective view of a wheel nut of the front wheel assembly of FIG. 16.

With continued reference to FIGS. 16 and 17, a mechanical fastener may be used to attach or couple wheel 212 to kingpin assembly 210 by way of wheel shaft 216. To maintain attachment of wheel 212 to wheel shaft 216 various fasteners may be used. One mechanical fastener that can be associated with a threaded bolt of the fastener is illustrated in FIGS. 21 and 22. As shown, nut 250 can have a first end 252 and a second end 254. Extending between first end 252 and second end 254 is channel 256 defined by, in this exemplary configuration, three chambers 258, 260, and 262. Chamber 258 can cooperate with an end of wheel shaft 216 (FIG. 16), while chamber 260 can be threaded to threadably engage with a fastener (not shown) that passes through wheel shaft 216 (FIG. 16). The exterior surface of nut 250 provides two generally flat portions 264 that can accommodate a wrench, socket, or other tool used to attach nut 250 to the fastener. In addition, nut 250 can include a stop structure 266 that prevents excessive attachment of nut 250 to the fastener (not shown). When nut 250 has been sufficiently attached to the fastener stop structure 266 may abut a portion of wheel 212 (FIG. 16). As indicated above, nut 250 is only one fastener that can be used to prevent wheel 212 (FIG. 16) from becoming disconnected from wheel shaft 216 (FIG. 16).

To control movement of front wheel assembly 16, as shown in FIG. 1, and so control the movement of recumbent bicycle 8 provided is steering assembly 16. The frame assembly 10 supports steering assembly 16 and provides attachment structures or members to facilitate mounting of steering assembly 16. For instance, and with reference to FIG. 2, frame assembly 10 includes first attachment member 80 and second attachment member 82. Disposed through a portion of first attachment member 80 is attachment tube 88.

Figure 23:
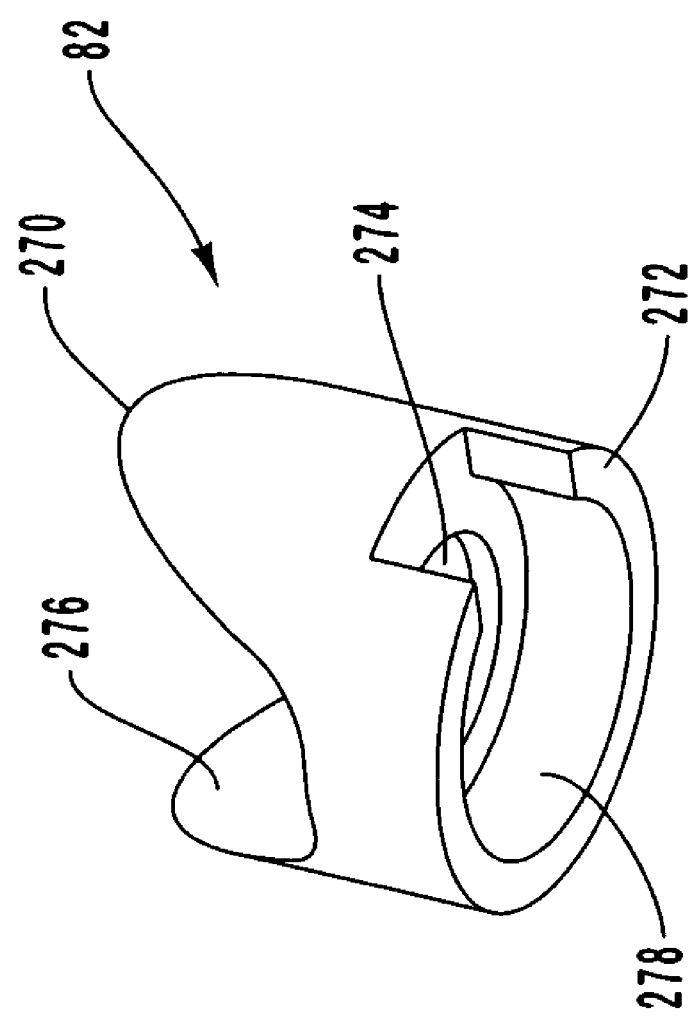
FIG. 23 illustrates a perspective view of an attachment member of the frame assembly of FIG. 2.

Turning to FIG. 23, illustrated is one configuration of attachment member 82. This attachment member 82 also aids to mount steering assembly 18 (FIG. 1) to frame assembly 10 (FIG. 1). The attachment member 82 includes a first end 270 and a second end 272. Extending between first end 270 and second end 272 is a hole 274. To aid with mounting attachment member 82 to frame assembly 10 (FIG. 2) and more specifically to tubular members 34 (FIG. 2), first end 270 includes a notched portion 276 that is complementary to the outer surface or exterior of frame assembly 10 (FIG. 2). This notched portion 276 may be attached to tubular member 34 (FIG. 2) by ways of welding, thermal bonding, chemical bonding, adhesives, mechanical fasteners, or combinations thereof. Alternatively, hole 274 may be threaded so that a fastener can pass through tubular member 34 (FIG. 2) and engage with hole 274.

Disposed at second end 272 is a recessed portion 278. This recessed portion 278 receives a portion of steering assembly 18 (FIG. 1) and securely retains the same. For instance, recessed portion 278 may receive a bearing of steering assembly 18 (FIG. 1). Various configurations of attachment member 82 are possible.

Figure 24:
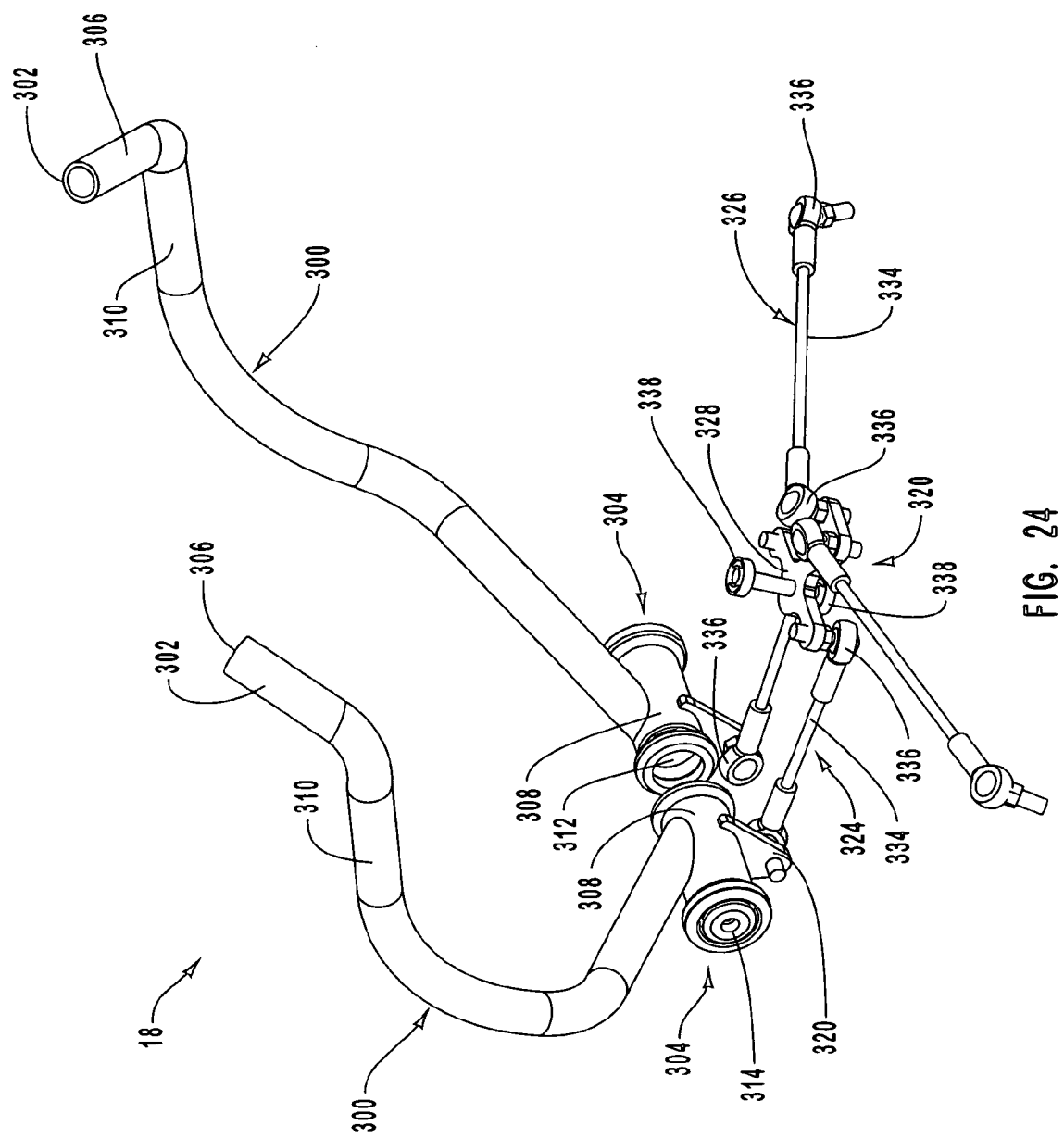
FIG. 24 illustrates a perspective view of a steering assembly of the recumbent bicycle of FIG. 1.

With reference now to FIG. 24, illustrated is one configuration of steering assembly 18. Generally, the steering assembly provides steering handles that are located to the sides of the seat. In this position, the rider can enter from the front of the seat and the handle positions allow an easy entry since there is nothing directly in front of the rider that would hamper his/her access to the seat. The curvature of handles, in addition to adding aesthetic appeal, allows clearance with the wheels when they turn. It also can provide a convenient armrest surface for the rider, provide aid to the rider when lifting himself/herself out of the seat, and a secure support that can be gripped during a tight turn.

To operate steering assembly 12, a rider can move one handle forward and one handle backward to make a turn. For instance, to turn left the rider extends his left arm forward and his right arm backward; and vice versa to turn right. This motion is transferred to the motion of the wheels using a linkage system. The linkages are selected so that steering assembly 12 also utilizes the benefits of Ackerman steering, i.e., the inside wheel turns more sharply than the outside wheel during a turn.

Using this type of steering also allows the rider to lock the orientation of the wheels in the direction of travel by holding or moving both handles together and not moving one forward or rearward of the other. This is usefully for dismounting the recumbent bicycle or for obtaining leverage to apply greater force to transmission assembly 20 (FIG. 1). When stationary, pulling back on the arms aids the rider to exit the seat. When moving, pulling back on the arms aids the rider to apply a greater force to transmission assembly 20 (FIG. 1), such as may be needed by the rider is moving up an incline. It also allows the rider to shift their body weight to apply a greater amount of weight to the front wheels during hill climbing.

In addition to the above, the controls can be used to control the amount a rider leans in a corner or turn. As discussed above, the seat can flex to enable the rider to lean into a corner. The amount of lean can be controlled by the rider pulling and pushing on the handles. This allows a rider to eliminate many of the problems associated with riding existing recumbent bicycles.

With continued reference to FIG. 24, steering assembly 18 includes handles 300, with the left handle being the mirror image of right handle. Each handle includes a first end 302 and a second end 304. The handles 300 have a generally serpentine configuration with a hand grip portion 306 at first end 302 for the rider to grasp, a headset mount 308 at second end 304, and an arm rest portion 310 disposed between first end 302 and second end 304 where a rider may rest his/her arm as he/she rides the recumbent bicycle. The handles 300 can support various hand controls near first end 302. For instance, mounted to hand grip portion 306 can be grip shifters or have mounted close thereto thumb shifters, brake levers, road-bicycle shifters, etc.

With continued reference to FIG. 24, headset mount 308 can have a generally cylindrical configuration with a hole 312 disposed therethrough. The hole 312 is configured to receive a headset 314 that in turn receives attachment tube 88 (FIG. 2). The headset 314 rotatably attaches handle 300 to attachment tube 88 (FIG. 2) to allow the backward and forward motion of handles 300. This headset 314 can be a sealed nonadjustable headset or an adjustable headset with associated optional bearing, bearing cup or cone, adjustable bearing cup or cone, and lock nut. One skilled in the art will know of the various configurations of a headset. It can be understood that headset 314 can be an off-the-shelf item to ease the difficulty of repairing the recumbent bicycle.

Mounted to headset mount 308 can be a lever arm 320. The lever arm 320 connects to a linkage assembly 322 so that rotational movement of handle 300 translates to movement of linkages 324 and 326 and hence movement of wheels 212 (FIG. 1). The lever arm 320, as illustrated in FIG. 24, can include a generally polygonal configuration with a hole that receives a portion of linkage 324. The hole can optionally include threads to facilitate secure attachment to linkage assembly 322. In other configuration, linkage assembly 322 may connect to lever arm 320 by way of a slip fit, friction fit, or interference fit connection. In still other configuration, lever arm 320 may be welded, thermally bonded, chemically bonded, adhesives, or other techniques known to one skilled in the art.

Linkage assembly 322 includes a number of linkages 324 and linkages 326 that are separated by a steering pivot 328. Each linkage 324 and 326 can include a rod 334 and one or more ball joints 336. In the illustrated configuration, linkage 324 extends from lever arm 320 to steering pivot 328, while linkage 326 extends from steering pivot 328 to kingpin assembly 210 (FIG. 16). The inclusion of ball joints 336 enables rotational motion of handle 300 about a first longitudinal axis of headset 314 to be translated into lateral motion of linkage 324, rotational motion of steering pivot 328 about an axis perpendicular to the first axis, and lateral motion of linkage 326 to result in wheel 212 (FIG. 1) being turned. To also aid with rotational motion of steering pivot 328, two bearings 338 mount to steering pivot 328 and in turn mount within recessed portion 278 (FIG. 23) of attachment member 82 (FIG. 2). The bearings 338 can be ball bearings, roller bearings, spherical bearings, or any other bearing capable of aiding with rotational motion of one component relative to another.

Figure 26:
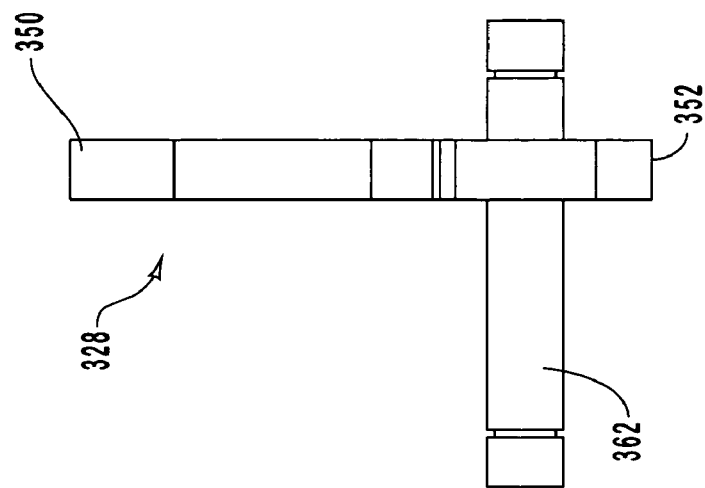
FIG. 26 illustrates a side view of a steering pivot of the steering assembly of FIG. 24.
Figure 25:
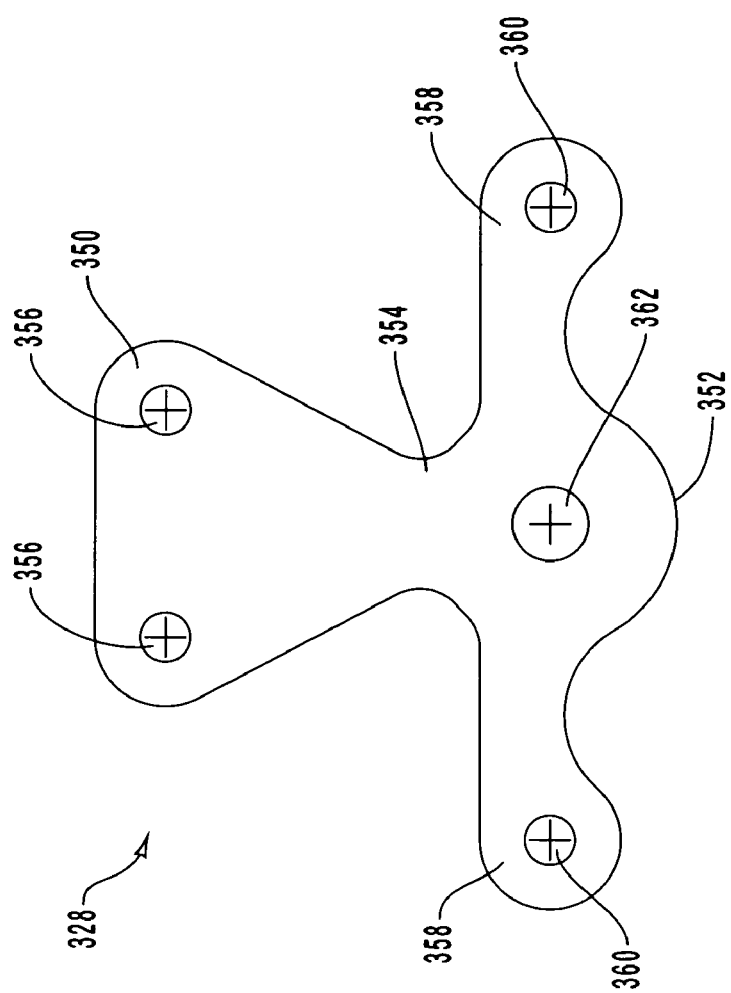
FIG. 25 illustrates a top view of a steering pivot of the steering assembly of FIG. 24.

The configuration of steering pivot 328 aids with translating the motion of linkages 324 into desired movement of linkages 326 so that the inside wheel of recumbent bicycle 8 (FIG. 1) turns more sharply than the outside wheel, i.e., provide Ackerman steering. The steering pivot 328, as shown in FIGS. 25 and 26, can include a first end 350, a second end 352, and an intermediate portion 354. First end 350 includes holes 356 that cooperate with ball joint 336 (FIG. 24) of linkage 326 (FIG. 24) so that linkage 324 (FIG. 24) can be attached to first end 350. One or more fasteners, such as but not limited to, nuts, releasable mount ball joint 336 (FIG. 24), which can have a threaded portion, to first end 350. Other fasteners or techniques of mounting ball joint 336 (FIG. 24) to first end 350 are possible. For instance, and not by way of limitation, a split pin may be disposed through a hole in a portion of ball joint 336 (FIG. 24).

As illustrated, steering pivot 328 tapers from first end 350 to intermediate portion 354. Extending from intermediate portion 354 are two arms 358 that terminate at second end 352. Disposed at the ends of arms 358 are holes 360 that cooperate with ball joint 336 (FIG. 24) of linkage 324 (FIG. 24). Linkages 324 can mount to holes 360 in a similar manner to linkages 326 mounting to holes 356. Disposed between holes 360, and optionally in axial alignment with such holes 360 is a pivot shaft 362. Pivot shaft 362 cooperates with bearings 338 (FIG. 24) to provide the rotational axis for steering pivot 328.

With this configuration, rotational movement of second end 352 about the longitudinal axis provided by pivot shaft 362 results in greater movement of one of linkages 326 than the other due to the rotational motion of holes 356. With reference to FIG. 24, when linkage 324 mounted to left handle 300, for instance, is moved forward, the relative movement of linkage 326 attached to the left wheel 212 (FIG. 1) of front wheel assembly 16 (FIG. 1) is less than the movement of linkage 326 attached to right wheel 212 (FIG. 1) resulting in right wheel 212 (FIG. 1) moving more sharply than left wheel 212 (FIG. 1). The reverse is also true for movement of right handle 300.

Thus far we have discussed the components and structures that facilitate steering of the recumbent bicycle and providing a comfortable ride for the rider. Following we will discuss the transmission assembly that provides the components and structure to enable a rider to translate movement of the rider's legs into movement of the recumbent bicycle. Following discussion of the transmission assembly, we will discuss alternative manners of powering the recumbent bicycle that may or may not include power output by the rider.

Figure 27:
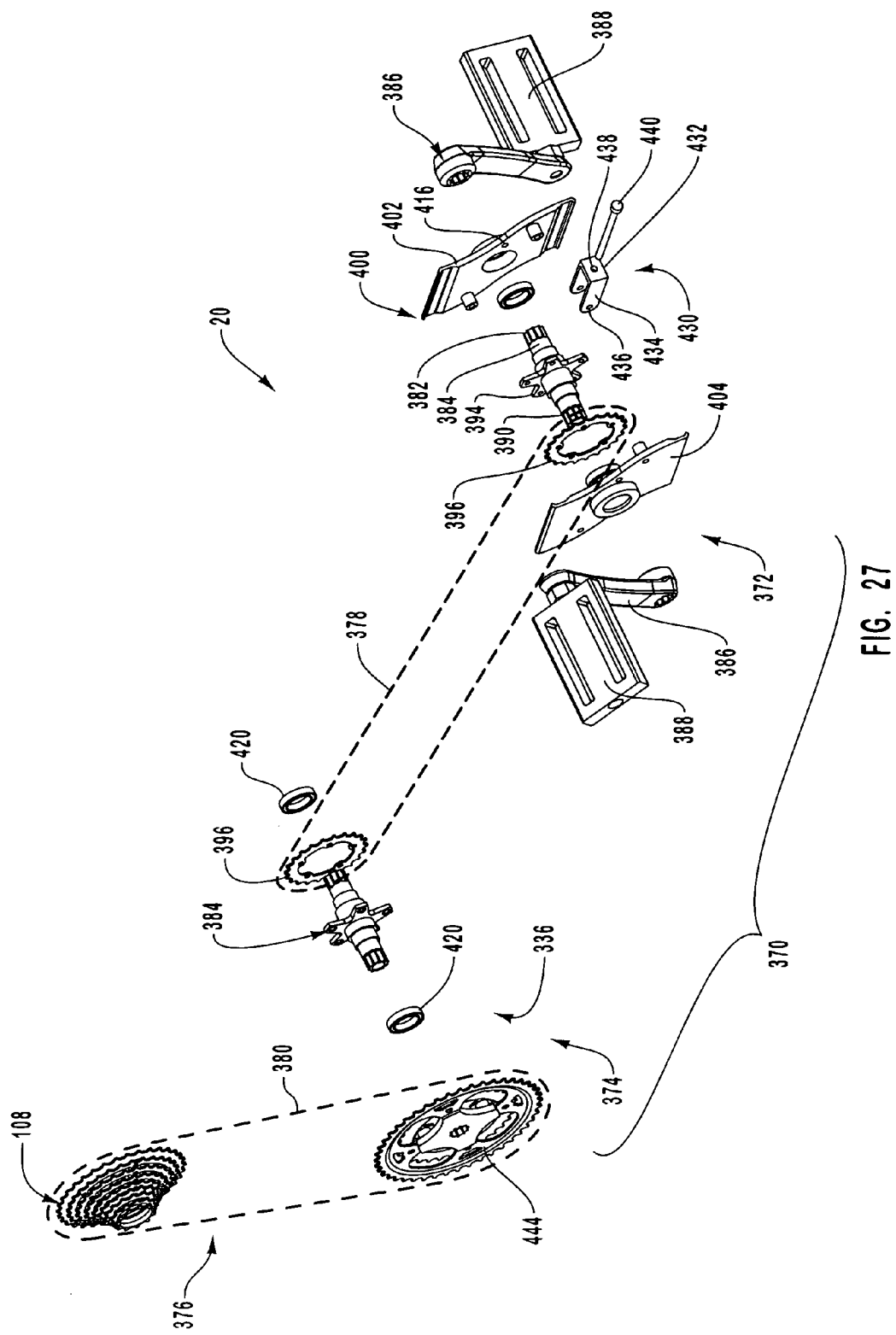
FIG. 27 illustrates an exploded perspective view of a transmission assembly of the recumbent bicycle of FIG. 1.

Generally, and with reference to FIG. 27, transmission assembly 20 is used to transfer energy form the rider to the wheels. The transmission assembly 20 uses two interconnected chain systems. A first chain system 370 transfers power from a front transmission assembly 372 to a rear transmission assembly 374. The second chain system 376 transfers power from rear transmission assembly 374 to rear cassette 108 of rear wheel 104 (FIG. 8). To achieve this desired interaction, transmission assembly 20 includes a first chain 378 and second chain 380, both of which are schematically represented by dotted lines.

The front transmission assembly 372 can include an axle 384 to which mounts a pair of crank arms 386 and associated pedals 388. The axle 384, crank arms 386 and pedals 388 can be off-the-shelf components to enable a rider to upgrade the recumbent bicycle and to make the bicycle easy to repair.

Axle 384 can have a first end 390 and a second end 392. Each of the ends 390 and 392 can have configuration that is complimentarily to crank arms 386 to prevent rotational motion of each crank arm 386 relative to axle 384. Stated another way, the configuration of cranks arms 386 and axle 384 is such that applying a force to crank arms 386 causes rotational motion of axle 384.

Disposed between first end 390 and second end 392 is a gear ring support 394. The gear ring support 394 provides a structure for mounting a gear ring 396 to axle 384 using one or more fasteners (not shown). The gear ring support 394 is illustrated as having five arms; however, other configurations of gear ring support 394 can include one or more arms.

To support axle 384 front transmission assembly 372 can include a transmission case 400. The illustrated transmission case 400 includes two halves; identified by reference numerals 402 and 404. These halves 402 and 404 attach to tubular members 34 (FIG. 2) and position axle 384 at different longitudinal positions along the length of tubular members 34 (FIG. 2). This allows a rider to vary the stride length of the recumbent bicycle to accommodate for riders having differing leg lengths.

Figure 29:
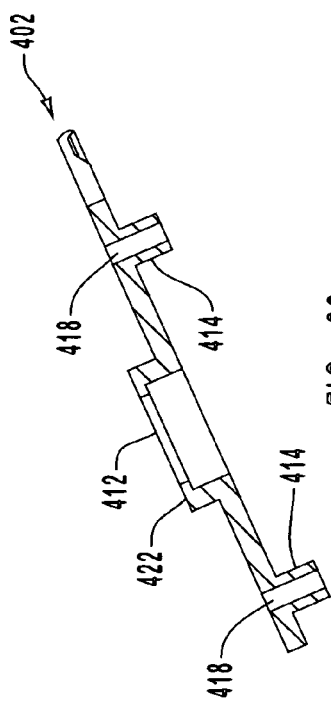
FIGS. 28–30 illustrate various views of a portion of a transmission case of the transmission assembly of FIG. 27.
Figure 30:
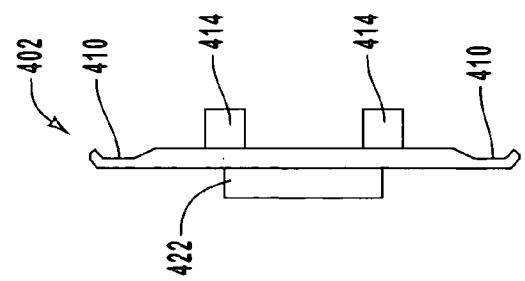
Figure 28:
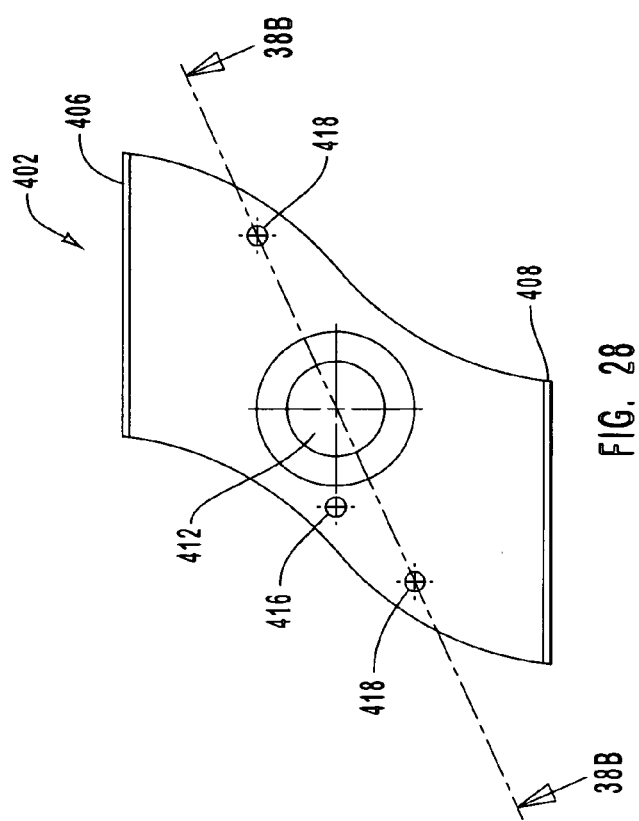

Referring to FIGS. 28-30, illustrated is one half 402 of transmission case 400. The following discussion will be directed to half 402 but the discussion also applies to other half since it is a mirror image of half 402. As shown, half 402 includes a first end 406 and a second end 408. Disposed at both first end 406 and second end 408 is a groove 410. These grooves 410 are configured to engage with a portion of tubular members 34 (FIG. 2) to prevent inadvertent movement of transmission case 400 (FIG. 34) during use. Located between first end 406 and second end 408 is an axle hole 412. Axle hole 412 is configured to receive a portion of axle 384 and may also accommodate a bearing 420 (FIG. 34), such as but not limited to, a roller bearing, a ball bearing, a spherical bearing or some other bearing that aids to reduce the affects of friction when axle 384 rotates. The axle hole 412 may also include a flange 422 to provide additional strength to half 402 at the location where greatest force will be applied by the rider.

In addition to axle hole 412, half 402 includes mounting protrusions 414 and a tensioner hole 416. Each mounting protrusion 414 include a hole 418 to receive a fastener. When half 402 and half 404 are disposed so that mounting protrusions 414 in each half are adjacent one another, the fastener can pass through hole 418 in each half 402 and 404 to attach one to another. It can be understood that one of each hole 418 can optionally be threaded to cooperate with the fastener or both can be unthreaded.

The tensioner hole 416 cooperates with tensioner 430, as illustrated in FIG. 27. As shown, tensioner 430 can have a generally U-shaped configuration having a base member 432 and two tongues 434 extending from base member 432. Each tongue 434 includes a hole 436, while base member 432 also includes a threaded hole 438. A fastener passes through tensioner hole 416 and engages tensioner 430 by way of holes 436. In one configuration, holes 436 are threaded to receive a threaded fastener. In another configuration, a single fastener extends between half 402 and half 404 while passing through holes 436 in tensioner 430.

With reference to FIG. 1 and FIG. 27, a tensioner bolt 440 cooperates with tensioner hole 438. The tensioner bolt 440 engages with nose member 22 and the head of tensioner bolt 440 is prevented from passing therethrough. The tensioner bolt 440 is used to make incremental changes to the tension of chain 378. For instance, when the stride length of transmission assembly 20 is varied by moving transmission case 400 and associated axle 384, crank arms 386 and pedals 388 along tubular members 34, the length of chain 378 also changes. The rider can vary the tension on chain 378 by rotating tensioner bolt 440 after generally positioning transmission case 400. Since the head of tensioner bolt 440 is prevented from passing through nose member 22, rotating tensioner bolt 440 in one direction draws transmission case 400 towards nose member 22. Similarly, rotating tensioner bolt 440 in the other direction moves transmission case 400 away from nose member 22. In this manner, incremental changes to chain 378 are possible.

With continued reference to FIG. 27, rear transmission assembly 374 includes many of the elements of front transmission assembly 372. For instance, rear transmission assembly 374 includes axle 384, gear ring 396 and bearings 420. In addition, rear transmission assembly 374 includes a main gear ring 444 that can have a similar configuration to standard gear rings for other bicycles. For instance, main gear ring 444 can include one or more individual gear rings that can be used to provide different gearing ratios to the rider. These gear rings are known to those skilled in the art.

Similarly, second gear chain system 376 can use "off-the-shelf" components to simplify repair and increase usability of recumbent bicycle 8 (FIG. 1). For instance, the distance between rear cassette 108 and main gear ring 444 can be similar to a standard distance so that chain 380 can be of a standard length.

In addition to providing a recumbent bicycle that is capable of being operated by a rider, i.e., movement of the rider translated into movement of the recumbent bicycle, the present invention can also utilize one or motors, whether electric or gasoline. For instance, alternative configurations of the recumbent bicycle can eliminate the need for the first transmission assembly, while including an electric or gasoline motor behind the seat. The drive shaft of the motor can either directly mount to main gear ring 444, include a gear that functions as gear ring 396, or include a gear that is chain linked to the either axle 394 or gear ring 396 of the rear transmission assembly. In this manner a rider can activate controls upon the handles to drive the rear wheel.

The inclusion of the electric or gasoline motor can be instead of or in addition to the first transmission assembly. When both are included, the rider can selectively activate the electric or gasoline motor to provide additional driving force when the rider is having difficulty or wishes a rest. The driving force or additional torque provided by the motor can be either sufficient to completely drive the recumbent bicycle or provide some assistance to the rider but not sufficient to completely drive the recumbent bicycle in all situations. Although reference is made to mounting the motor behind the seat, it will be understood that various other locations are possible. For instance, the motor may be mounted within the rear transmission case 26. In still another configuration, a hub mounted motor may be attached to the hub of the rear wheel. In this later case, the rear transmission assembly and/or the front transmission assembly may be eliminated. When electric motors are used, the batteries may be disposed between the tubular members of the frame assembly.

In addition to the above, the recumbent bicycle can include various shrouds to protect the rider from weather elements. For instance, a water proof or resistant and/or wind proof or resistant canopy or shroud can extend from the back of the seat over the rider and surround the rider's legs. In another configuration, the shroud or canopy may extend below the legs of the rider and prevent debris from hitting the rider. Other configurations of the canopy or shroud may be possible, such as, but not limited to, doors, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A recumbent vehicle comprising:
    a frame having a first portion and a second portion, said frame comprising at least one tubular member, said at least one tubular member having a first end, a second end, and a channel extending from said first end towards said second end;
    a rear wheel assembly pivotally mounted to said first portion of said frame;
    a transmission assembly supported by said frame, said transmission assembly comprising a first gear and a second gear mounted to said frame, and a chain extending from said first gear to said second gear and through said channel of said at least one tubular member; and
    a pair of front wheels mounted to said frame at a location intermediate of said first portion and said second portion of said frame.

2. The recumbent vehicle of claim 1, wherein a pair of leaf springs mount said pair of front wheels to said frame.

3. The recumbent vehicle of claim 2 wherein each leaf spring is curved in at least two directions.

4. The recumbent vehicle of claim 1, wherein said second gear is slidable relative to said first gear.

5. The recumbent vehicle of claim 1, further comprising a steering assembly mounted to said frame and engageable with said pair of font wheels, said steering assembly further comprises two arms, each said arms having a first end, a second end, and an integral arm rest portion disposed between said first end and said second.

6. The recumbent vehicle of claim 1, further comprising a shock assembly disposed between said rear wheel assembly and said frame, said shock assembly comprising a plurality of interchangeable resistance members, each resistance member providing a different quantity of resistance to movement of said rear wheel assembly relative to said frame.

7. The recumbent vehicle of claim 6, wherein said shock assembly comprises:
    a rear shock mount having a lumen;
    a shock shaft disposable and movable within said lumen; and
    at least one resistance member of said plurality of interchangeable resistance members slidably received by said shock shaft and disposable between said rear shock mount and said frame.

8. The recumbent vehicle of claim 7, wherein said rear shock mount is part of said rear wheel assembly.

9. The recumbent vehicle of claim 7, further comprising a lock member selectively positionable on said shock shaft, said lock member selectively positionable to vary a biasing force applied by each resistance member of said plurality of interchangeable resistance members.

10. A recumbent vehicle comprising:
    a frame comprising at least two tubular members, said at least two tubular member each having a first end, a second end, and a channel extending from said first end towards said second end;
    a rear wheel assembly mounted to said frame;
    a transmission assembly supported by said frame, said transmission assembly comprising a first gear and a second gear mounted to said frame, and a chain extending from said first gear to said second gear and through said channel of said at least two tubular members; and
    a pair of front wheels mounted to said frame.

11. The recumbent vehicle of claim 10, wherein said pair of front wheels mount to said frame at an intermediate location of said frame.

12. The recumbent vehicle of claim 10, wherein said pair of front wheels mount to said frame by a at least one leaf spring.

13. The recumbent vehicle of claim 10, further comprising a steering assembly mounted to said frame, said steering assembly engages with said pair of front wheels, said steering assembly further comprises two arms, each said arm having a first end, a second end, and an integral arm rest portion disposed between said first end and said second.

14. The recumbent vehicle of claim 10, further comprising a shock assembly disposed between said rear wheel assembly and said frame, said shock assembly comprising a plurality of interchangeable resistance members, each resistance member providing a different quantity of resistance to movement of said rear wheel assembly relative to said frame.

15. The recumbent vehicle of claim 14, wherein said shock assembly comprises:
    a rear shock mount having a channel;
    a shock shaft disposable and movable within said channel; and
    at least one resistance member of said plurality of interchangeable resistance members slidably received by said shock shaft and disposable between said rear shock mount and said frame.

16. The recumbent vehicle of claim 14, further comprising a lock member selectively positionable on said shock shaft, said lock member selectively positionable to vary a biasing force applied by each resistance member of said plurality of interchangeable resistance members.

17. A recumbent vehicle comprising:
    a frame comprising a tension case, a movable member disposed from the transmission case, and two spaced apart tubular members extending between said transmission case and said movable member, each of said tubular member having a channel extending from said movable member toward said transmission case;
    a plurality of wheels mounted to said frame;
    a first gear and a second gear supported by said frame; and
    a chain extending from said first gear to said second gear and through said channel of each of said two tubular members.

18. The recumbent vehicle of claim 17, further comprising an Ackerman steering assembly mounted to said frame and engages with at least two of said plurality of wheels.

19. The recumbent vehicle of claim 17, further comprising a seat mounted to said frame, said seat being pivotal relative to said frame.

20. The recumbent vehicle of claim 19, wherein said seat comprises a first side and a second side, each of said first side and said second side flexing as a steering assembly steers the recumbent vehicle.

21. The recumbent vehicle of claim 17, wherein each tubular member comprises a second channel, said movable member being movable within said second channel.

22. The recumbent vehicle of claim 17, further comprising a rear support structure flexibly mounted to said frame and supporting a rear wheel of said plurality of wheels.

23. The recumbent vehicle of claim 22, further comprising a rear shock mounted to said rear support structure and to said frame.

\* \* \* \* \*

UNITED STATES PATENT AND TRADEMARK OFFICE
CERTIFICATE OF CORRECTION

| | |
|---|---|
| PATENT NO. | : 7,114,737 B1 |
| APPLICATION NO. | : 11/097813 |
| DATED | : October 3, 2006 |
| INVENTOR(S) | : Rasmussen |

It is certified that error appears in the above-identified patent and that said Letters Patent is hereby corrected as shown below:

Column 3
Line 55, after "bicycle" insert --of FIG. 1--
Line 56, remove [FIG. 1;]
Line 60, after "of the" insert --frame assembly of FIG. 2--
Line 61, remove [FIG. 2]

Column 4
Line 2, after "wheel" insert --assembly of FIG. 16--
Line 3, remove [FIG. 16]
Line 20, after Line 20, insert the section heading --DETAILED DESCRIPTION OF THE EMBODIMENTS--

Column 6
Line 25, change "38" to --36--
Line 40, change "12" to --10--

Column 7
Line 19, change "54" to --56--
Line 21, change "54" to --56--
Line 32, change "54" to --56--
Line 37, change "32" to --10--
Line 60, change "10" to --8--
Line 61, change "60" to --62--
Line 62, change "provides" to --provide--

Column 8
Line 64, remove [to]
Line 65, change "64" to --66--

Column 9
Line 7, change "member" to --assembly--
Line 7, change "1" to --8--
Line 21, change "64" to --66--

UNITED STATES PATENT AND TRADEMARK OFFICE
CERTIFICATE OF CORRECTION

PATENT NO.      : 7,114,737 B1
APPLICATION NO. : 11/097813
DATED           : October 3, 2006
INVENTOR(S)     : Rasmussen It is certified that error appears in the above-identified patent and that said Letters Patent is hereby corrected as shown below:

Column 10
Line 4, change "9" to --10--

Column 11
Line 38, change "76" to --86--

Column 12
Line 8, after "assembly" insert --198--
Line 15, change "provide" to --provides--
Line 28, change "incline" to --is inclined--
Line 48, remove [a]
Line 57, change "match" to --matching--

Column 15
Line 12, change "comer" to --corner--
Line 14, change "comer" to --corner--
Line 29, after "thereto" insert --can be--

Column 16
Line 13, after "i.e.," insert --to--
Line 18, change "324" to --326--
Line 20, change "releasable" to --releasably--

Column 17
Line 41, change "34" to --27--
Line 50, change "include" to --includes--

Column 18
Line 1, change "1" to --2--
Line 39, after "or" insert --more--
Line 46, change "394" to --384--

UNITED STATES PATENT AND TRADEMARK OFFICE
CERTIFICATE OF CORRECTION

PATENT NO. : 7,114,737 B1
APPLICATION NO. : 11/097813
DATED : October 3, 2006
INVENTOR(S) : Rasmussen It is certified that error appears in the above-identified patent and that said Letters Patent is hereby corrected as shown below:

<u>Column 19</u>
Line 43, change "font" to --front--
Line 44, change "arms" to --arm--

<u>Column 20</u>
Line 29, after "second" insert --end--
Line 53, change "tension" to --transmission--

Signed and Sealed this

Twentieth Day of May, 2008

JON W. DUDAS
*Director of the United States Patent and Trademark Office*